United States Patent
Ono

(10) Patent No.: US 9,727,820 B2
(45) Date of Patent: Aug. 8, 2017

(54) VEHICLE BEHAVIOR PREDICTION DEVICE AND VEHICLE BEHAVIOR PREDICTION METHOD, AND DRIVING ASSISTANCE DEVICE

(75) Inventor: Sayaka Ono, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 396 days.

(21) Appl. No.: 14/372,359

(22) PCT Filed: Jan. 20, 2012

(86) PCT No.: PCT/JP2012/051271
§ 371 (c)(1),
(2), (4) Date: Jul. 15, 2014

(87) PCT Pub. No.: WO2013/108406
PCT Pub. Date: Jul. 25, 2013

(65) Prior Publication Data
US 2014/0358841 A1    Dec. 4, 2014

(51) Int. Cl.
*G06N 7/00* (2006.01)
*G08G 1/01* (2006.01)
(Continued)

(52) U.S. Cl.
CPC ........... *G06N 7/00* (2013.01); *B60W 30/0956* (2013.01); *G06N 7/005* (2013.01); *G08G 1/0112* (2013.01);
(Continued)

(58) Field of Classification Search
CPC .................................................... G06N 7/005
(Continued)

(56) References Cited

U.S. PATENT DOCUMENTS

2011/0246016 A1    10/2011    Vang et al.
2011/0246051 A1    10/2011    Vang et al.

FOREIGN PATENT DOCUMENTS

| JP | 6 215300 | 8/1994 |
|---|---|---|
| JP | 2002 236994 | 8/2002 |

(Continued)

OTHER PUBLICATIONS

Koutsopoulos et al ("Latent class model for car following behavior" 2012).*

(Continued)

*Primary Examiner* — Lut Wong
(74) *Attorney, Agent, or Firm* — Oblon, McClelland, Maier & Neustadt, L.L.P.

(57) ABSTRACT

In order to provide a vehicle behavior prediction device and a vehicle behavior prediction method, and a driving assistance device that uses said vehicle behavior prediction device, which enables vehicle behavior to be predicted in a highly accurate manner, a vehicle control device is installed in a vehicle. This vehicle control device is provided with a distribution calculation unit and a vehicle behavior prediction unit. The distribution calculation unit determines, on the basis of driving condition information that has been collected, probability distributions for when deceleration behavior occurs and does not occur. The vehicle behavior prediction unit determines the relative positional relationships between the driving speed and acceleration of vehicles ahead with respect to the probability distributions, and, on the basis of the relative positional relationships that have been determined, predicts the behavior of a vehicle that is subject to prediction.

18 Claims, 20 Drawing Sheets

(51) Int. Cl.
G08G 1/0962 (2006.01)
G08G 1/0967 (2006.01)
G08G 1/16 (2006.01)
B60W 30/095 (2012.01)

(52) U.S. Cl.
CPC ....... *G08G 1/0129* (2013.01); *G08G 1/09626* (2013.01); *G08G 1/096716* (2013.01); *G08G 1/096725* (2013.01); *G08G 1/096741* (2013.01); *G08G 1/096775* (2013.01); *G08G 1/096791* (2013.01); *G08G 1/163* (2013.01); *G08G 1/166* (2013.01); *B60W 2550/302* (2013.01); *B60W 2550/304* (2013.01); *B60W 2550/306* (2013.01); *B60W 2550/402* (2013.01)

(58) Field of Classification Search
USPC .......................................................... 706/52
See application file for complete search history.

(56) References Cited

FOREIGN PATENT DOCUMENTS

| | | |
|---|---|---|
| JP | 2010 66895 | 3/2010 |
| JP | 2011 192177 | 9/2011 |
| JP | 2011 216090 | 10/2011 |
| JP | 2011 221698 | 11/2011 |

OTHER PUBLICATIONS

Angkititrakul et al ("Evaluation of Driver-Behavior Models in Real-World Car-Following Task" 2009).*

Kumagai et al ("Prediction of Driving Behavior through Probabilistic Inference" 2003).*

International Search Report Issued Apr. 10, 2012 in PCT/JP12/051271 Filed Jan. 20, 2012.

* cited by examiner

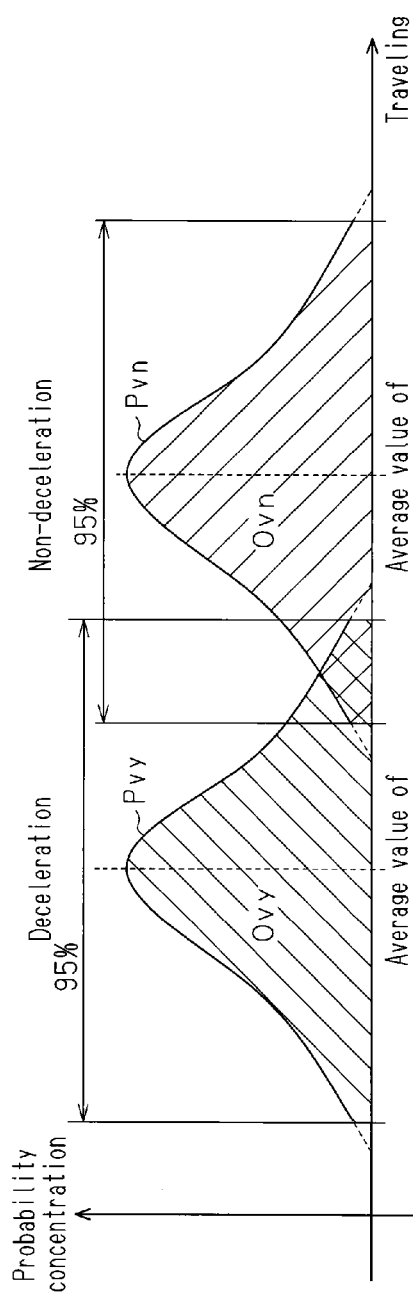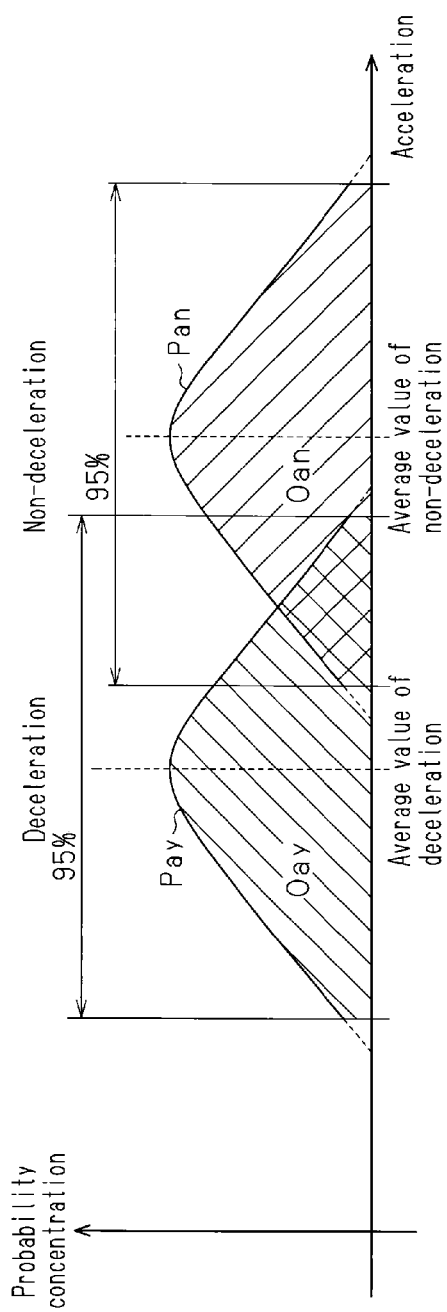

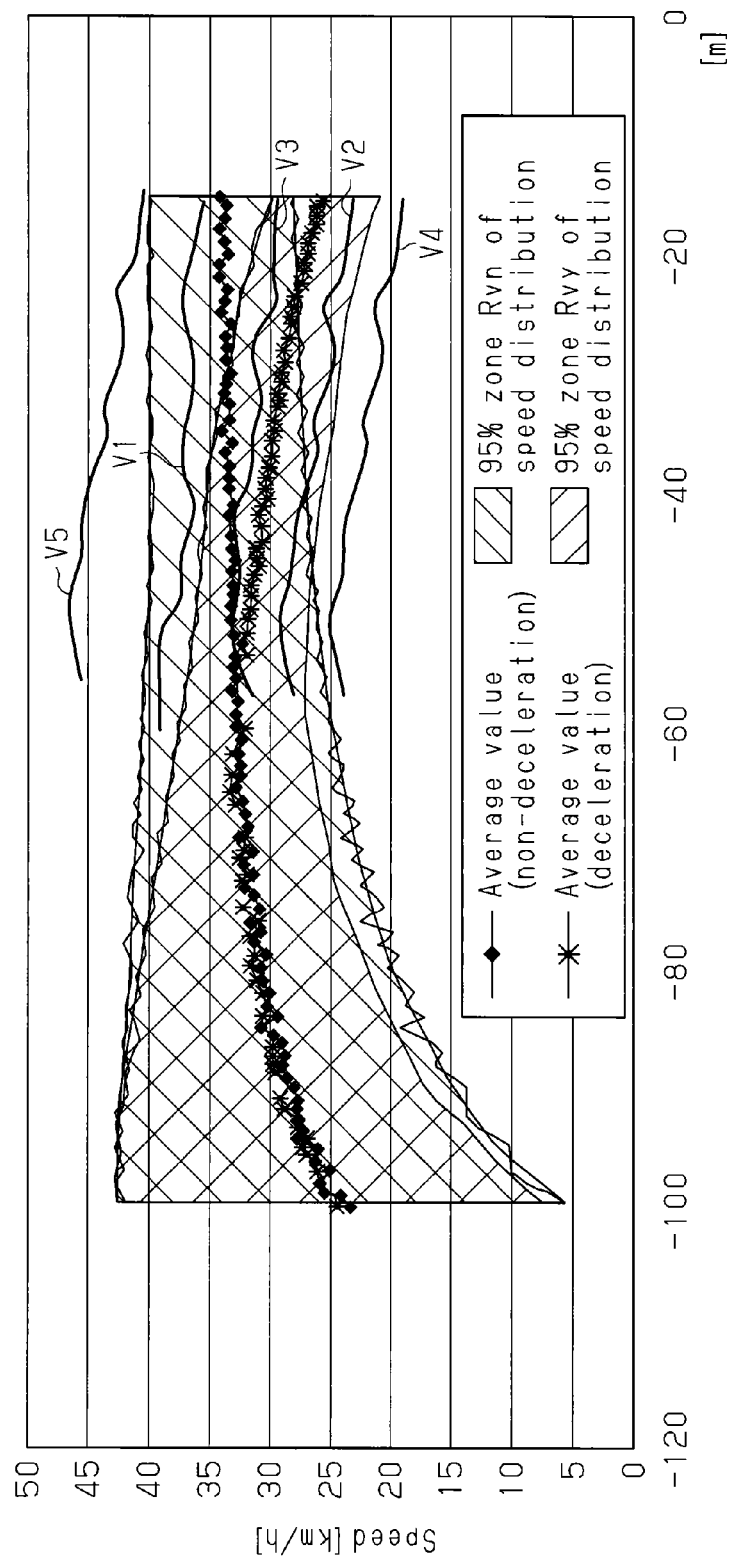

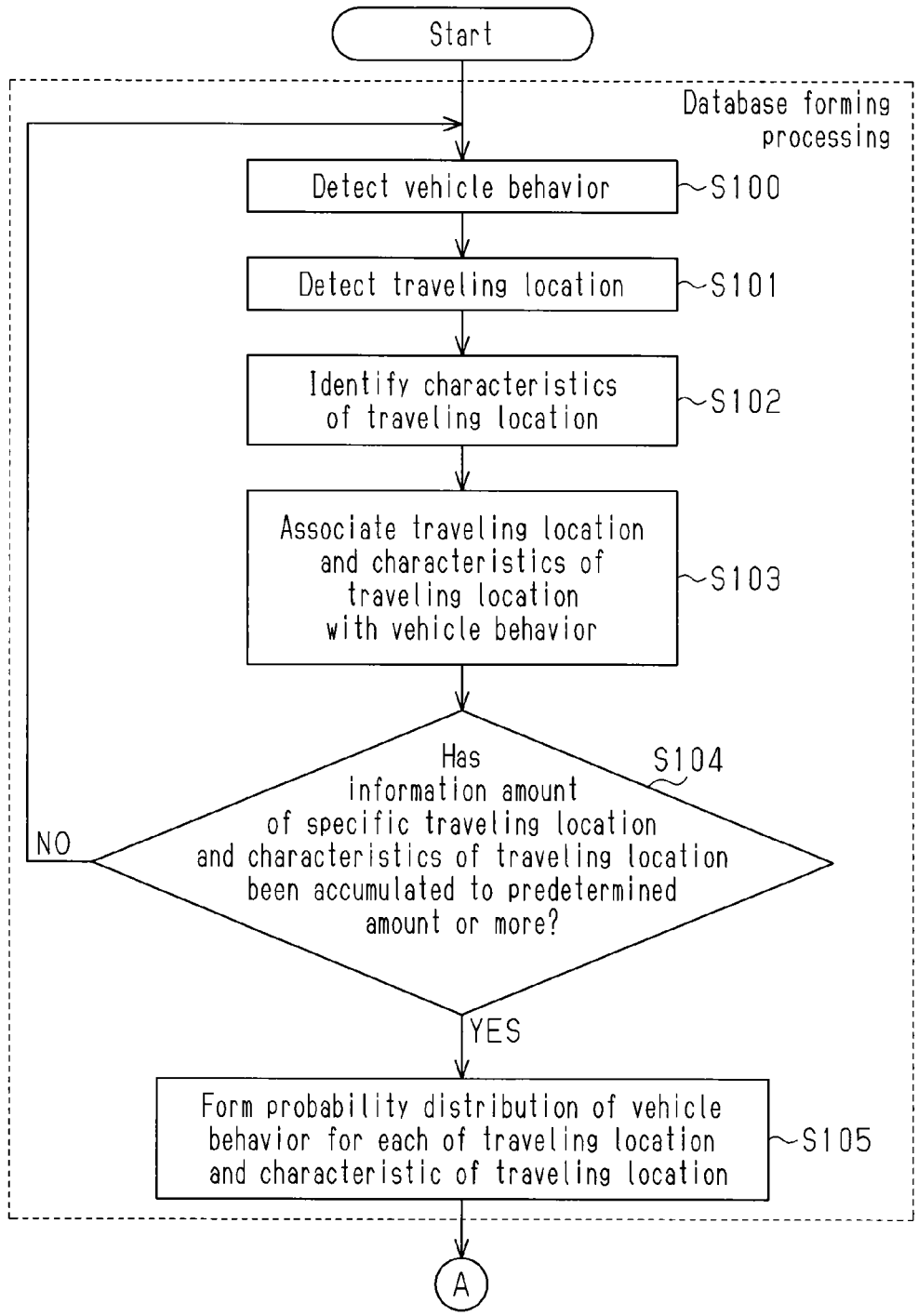

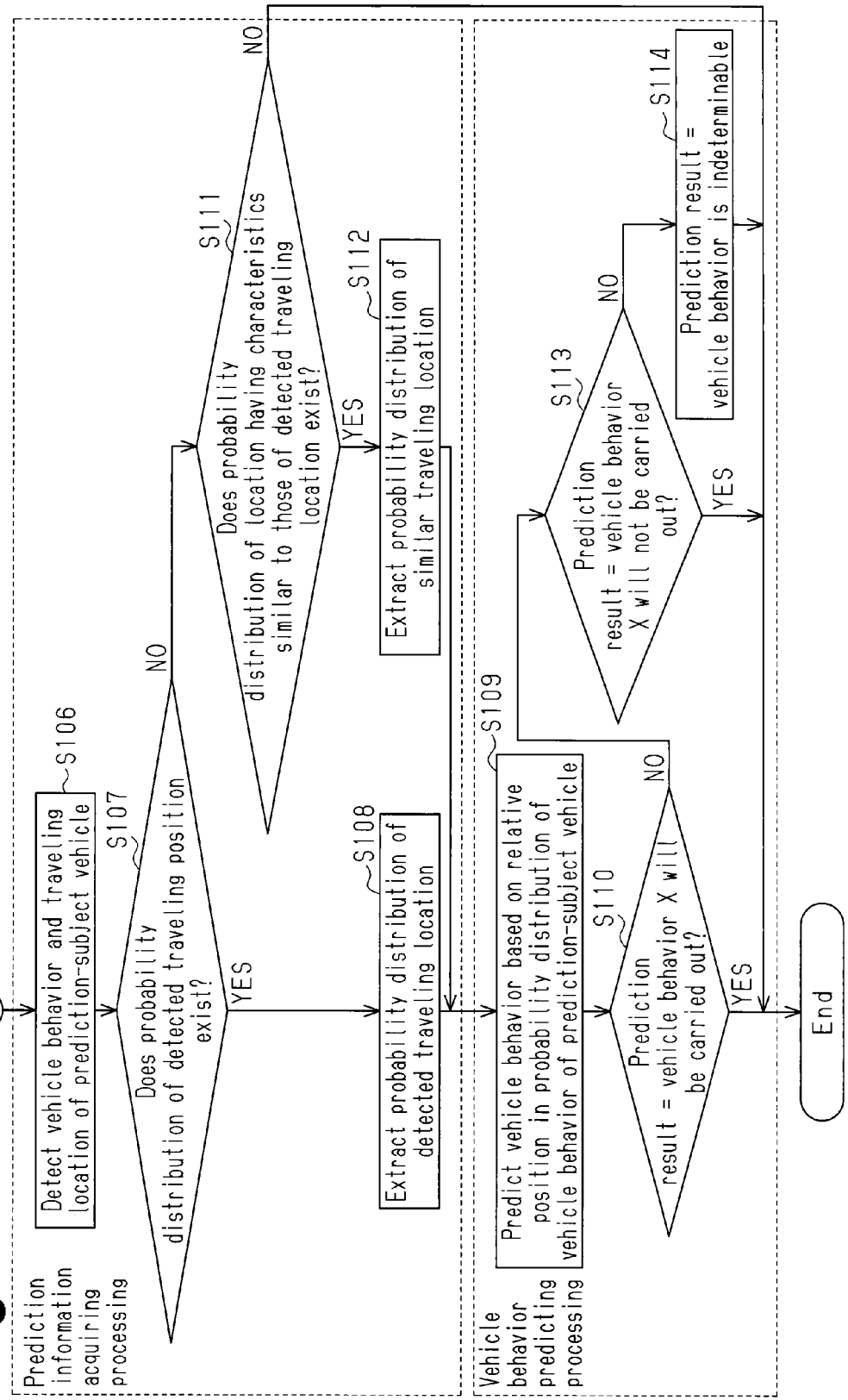

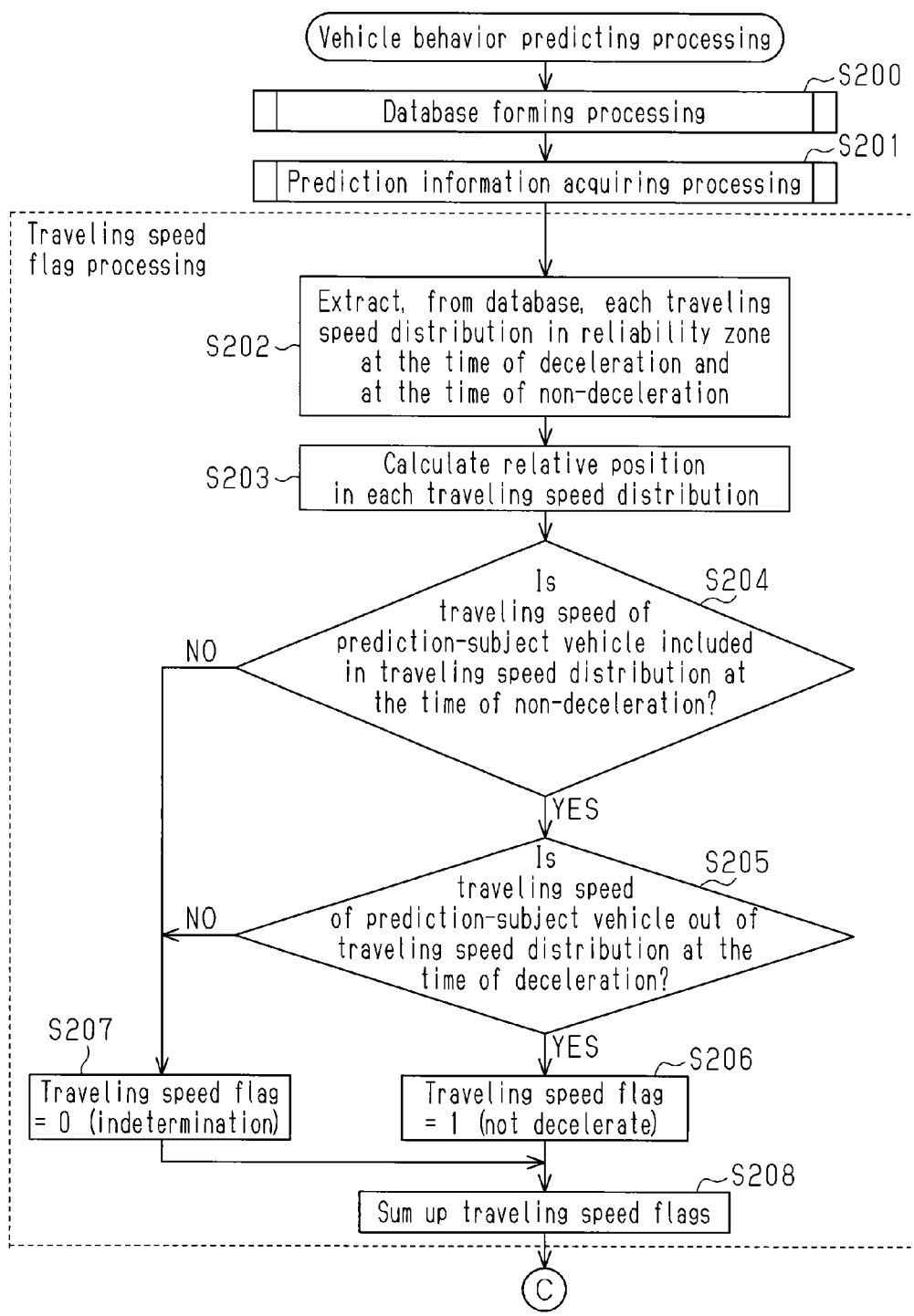

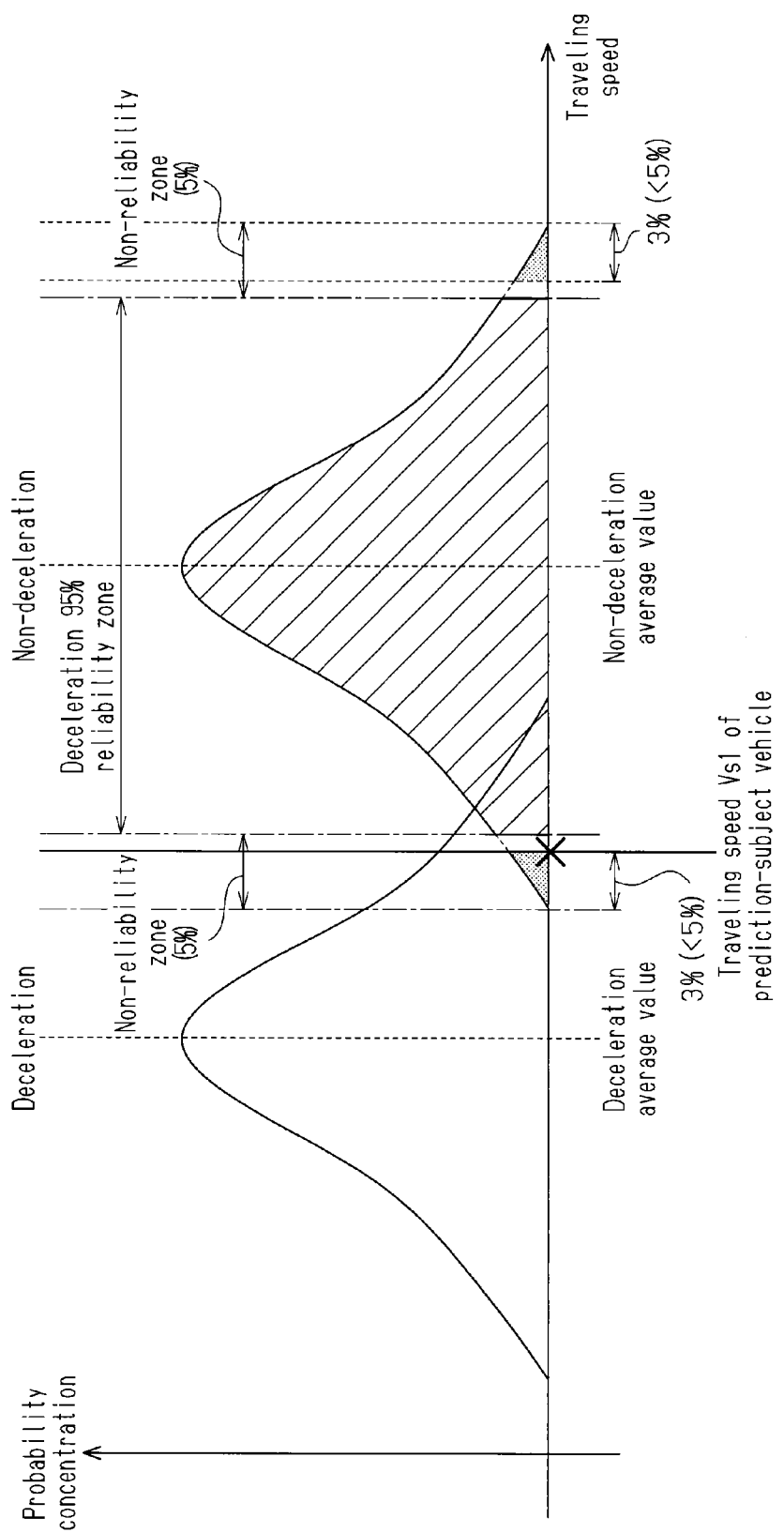

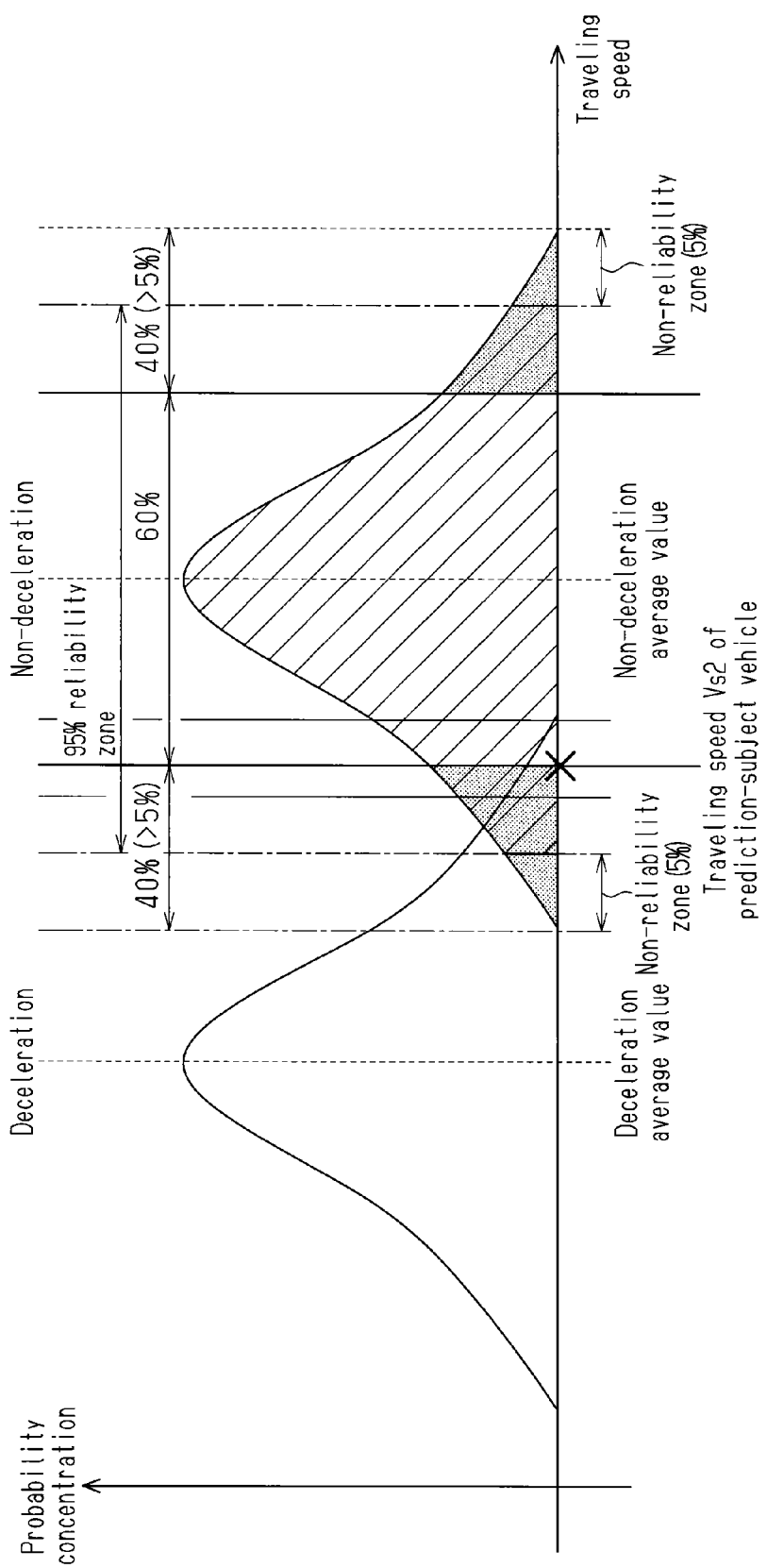

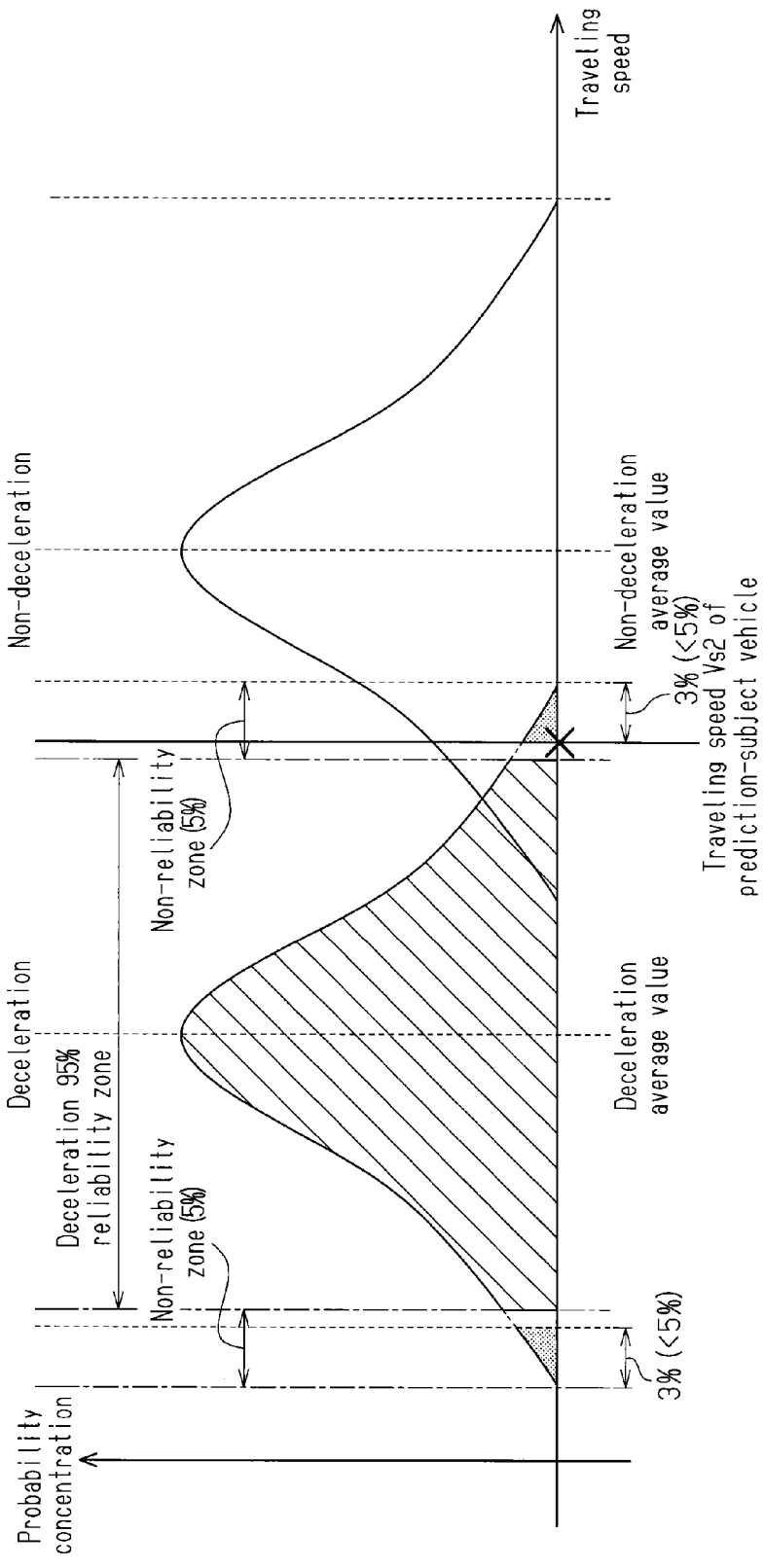

[Indetermination pattern 2 (included in both reliability zones): distribution of traveling speed at location of 40 m short of intersection]

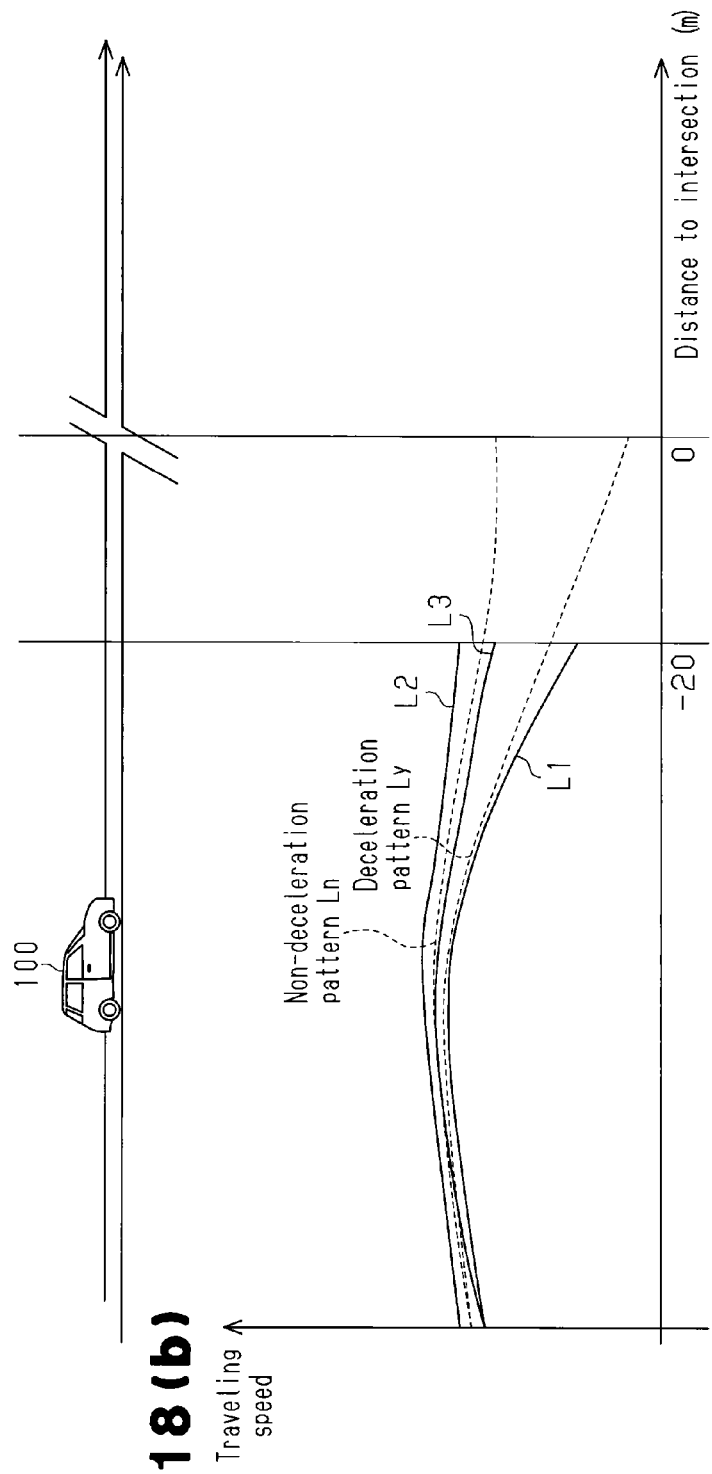

VEHICLE BEHAVIOR PREDICTION DEVICE AND VEHICLE BEHAVIOR PREDICTION METHOD, AND DRIVING ASSISTANCE DEVICE

FIELD OF THE DISCLOSURE

The present invention relates to a vehicle behavior prediction device and a vehicle behavior prediction method that are suitably applied for predicting vehicle behavior, and to a driving assistance device using the vehicle behavior prediction device.

BACKGROUND OF THE DISCLOSURE

Navigation systems and the like of recent years assist various kinds of driving operations such as deceleration assistance for a driver of a vehicle that travels around an intersection where a traffic light is provided or around traffic elements such as a curve for example. Such a navigation system acquires information representing existence of a traffic element or a phase cycle of a traffic light, which require a decelerating operation, from infrastructure information or road traffic information sent from an infrastructure communication device provided on a road or a road traffic information center for example, and assists a driving operation such as deceleration assistance based on the acquired information.

According to a device described in Patent Document 1 for example, a driving pattern of a vehicle (subject vehicle) that travels on a road is previously classified into a speed changing pattern when a traffic light shows red phase and a speed changing pattern when the traffic light shows green phase, and the classified speed changing patterns are stored in a storage device provided in the vehicle. This device acquires information representing speed and the like of a vehicle in front which travels in front of the subject vehicle in the traveling direction, and identifies to which one of the speed changing patterns stored in the storage device the transition of speed of the vehicle in front indicated by the acquired information corresponds. If this device identifies that the speed changing pattern of the vehicle in front is the speed changing pattern in the green phase of the traffic light, the device determines that necessity of deceleration or stop is low and suppresses execution of deceleration assistance. According to this, the device described in Patent Document 1 assists the driving operation in accordance with the phase of a traffic light without using information related to a phase cycle of the traffic light.

PRIOR ART DOCUMENTS

Patent Documents

Patent Document 1: Japanese Laid-Open Patent Publication No. 2011-192177

SUMMARY OF THE INVENTION

Problems that the Invention is to Solve

Meanwhile, when transition of speed of the vehicle in front matches with a speed pattern in the red phase of the traffic light for example, the device described in Patent Document 1 predicts, without exception, that the vehicle in front will decelerate in accordance with the red phase. On the other hand, when the transition of speed of the vehicle in front does not match with any of the speed patterns stored in the storage device, the device predicts, without exception, that the vehicle in front will not decelerate.

However, a speed pattern of an actual vehicle differs depending upon the driver or difference in surrounding environment when the vehicle travels. From this reason, the speed pattern itself of the vehicle includes variation. Hence, even if transition of traveling speed of the vehicle to be predicted (prediction-subject vehicle, hereinafter) matches with a specific speed pattern, it is not always true that the prediction-subject vehicle exhibits behavior common with the matched speed pattern. Similarly, even if transition of traveling speed of the prediction-subject vehicle shows transition that does not match with the specific speed pattern, the prediction-subject vehicle exhibits, in some cases, behavior common with the specific speed pattern.

According to the device described in Patent Document 1, it is difficult to predict behavior of a prediction-subject vehicle depending upon a matching level with respect to a previously defined speed pattern, there is a room for improvement in prediction precision of the vehicle behavior.

The present invention has been accomplished in view of such circumstances, and it is an object of the invention to provide a vehicle behavior prediction device and a vehicle behavior prediction method capable of accurately predict vehicle behavior, and to provide a driving assistance device using the vehicle behavior prediction device.

Means for Solving the Problems

Means for achieving the above objective and advantages thereof will now be discussed.

To achieve the foregoing objective, the present invention provides a vehicle behavior prediction device for predicting vehicle behavior based on traveling state information representing a traveling state of a vehicle. The vehicle behavior prediction device includes a distribution calculating unit and a vehicle behavior prediction unit. The distribution calculating unit collects the traveling state information and obtains a plurality of kinds of probability distributions representing occurrence probability of vehicle behavior based on the collected traveling state information. The vehicle behavior prediction unit obtains a relative positional relationship with respect to the plurality of kinds of probability distributions of vehicle behavior of a prediction-subject vehicle and predicts vehicle behavior of the prediction-subject vehicle based on the obtained relative positional relationship.

To achieve the foregoing objective, the present invention also provides a vehicle behavior prediction method for predicting vehicle behavior based on traveling state information representing a traveling state of a vehicle. The method includes: a distribution calculating step of collecting the traveling state information and obtaining a plurality of kinds of probability distributions representing occurrence probability of vehicle behavior based on the collected traveling state information; and a predicting step of obtaining a relative positional relationship of a prediction-subject vehicle with respect to the plurality of kinds of probability distribution of vehicle behavior and predicting vehicle behavior of the prediction-subject vehicle based on the obtained relative positional relationship.

According to the above-described configuration or method, the plurality of kinds of probability distributions representing the occurrence probability of vehicle behavior is formed. The probability distributions represent a likelihood of occurrence and non-occurrence of predetermined vehicle behavior, and based on the relative positional relationship of vehicle behavior of prediction-subject vehicle with respect to the probability distributions, it is possible to predict vehicle behavior shown by the subject vehicle. According to this configuration or method, the plurality of kinds of probability distributions is used when vehicle behavior is predicted. According to this, it is possible to predict vehicle behavior from a plurality of viewpoints using the plurality of kinds of probability distributions, and it is possible to accurately predict vehicle behavior.

According to above-described configuration, if it is only possible to detect vehicle behavior of a prediction-subject vehicle, it is possible to predict vehicle behavior after that vehicle. Hence, it is possible to predict vehicle behavior without acquiring information indicating a traveling state of the prediction-subject vehicle through communication with this vehicle.

According to one aspect of the present invention, the plurality of kinds of probability distributions includes a probability distribution at occurrence of specific vehicle behavior and a probability distribution at non-occurrence of the specific vehicle behavior.

According to one aspect of the present invention, a probability distribution at occurrence of specific vehicle behavior and a probability distribution at non-occurrence of the specific vehicle behavior are used as the plurality of kinds of probability distributions.

According to the above-described configuration or method, the present invention is especially effective using the probability distribution at the occurrence of a specific vehicle behavior and the probability distribution at non-occurrence of the specific vehicle behavior as the plurality of kinds of probability distributions. That is, if opposed probability distributions for common vehicle behavior are used, it is possible to predict vehicle behavior based on both the probability of occurrence the specific vehicle behavior and the probability of non-occurrence of the specific vehicle behavior. According to this, it is possible to more accurately predict vehicle behavior of a prediction-subject vehicle.

According to one aspect of the present invention, when a relative positional relationship of vehicle behavior of the prediction-subject vehicle belongs to the probability distribution at non-occurrence of the specific vehicle behavior and does not belong to the probability distribution at occurrence of the specific vehicle behavior, the vehicle behavior prediction unit predicts that the prediction-subject vehicle will not exhibit corresponding vehicle behavior.

According to one aspect of the present invention, in the predicting step, when a relative positional relationship of vehicle behavior of the prediction-subject vehicle belongs to the probability distribution at non-occurrence of the specific vehicle behavior and does not belong to the probability distribution at occurrence of the specific vehicle behavior, it is predicted that the prediction-subject vehicle will not exhibit corresponding vehicle behavior.

When vehicle behavior of a prediction-subject vehicle belongs to the probability distribution at non-occurrence of specific vehicle behavior, there is a tendency that the vehicle will not exhibit the specific vehicle behavior. Further, when vehicle behavior of the prediction-subject vehicle does not belong to a probability distribution at occurrence of the specific vehicle behavior, the probability that the vehicle will exhibit the specific vehicle behavior is low. That is, the probability that the vehicle will not exhibit the specific vehicle behavior is high.

Hence, as shown in the above-described configuration or method, the vehicle behavior prediction device predicts that a prediction-subject vehicle will not exhibit the corresponding vehicle behavior under conditions that a relative positional relationship of vehicle behavior of a prediction-subject vehicle belongs to a probability distribution at non-occurrence of the specific vehicle behavior and the relative positional relationship does not belong to a probability distribution at occurrence of the specific vehicle behavior. According to this, it is possible to accurately predict that the prediction-subject vehicle will not exhibit the corresponding vehicle behavior based on the opposed probability distributions.

According to one aspect of the present invention, when a relative positional relationship of vehicle behavior of the prediction-subject vehicle does not belong to the probability distribution at non-occurrence of the specific vehicle behavior or belongs to both the probability distribution at non-occurrence of the specific vehicle behavior and the probability distribution at occurrence of the specific vehicle behavior, the vehicle behavior prediction unit determines that it is indeterminable whether the prediction-subject vehicle will exhibit vehicle behavior.

According to one aspect of the present invention, in the predicting step, when a relative positional relationship of vehicle behavior of the prediction-subject vehicle does not belong to the probability distribution at non-occurrence of the specific vehicle behavior or belongs to both the probability distribution at non-occurrence of the specific vehicle behavior and the probability distribution at occurrence of the specific vehicle behavior, it is determined that it is indeterminable whether vehicle behavior of the prediction-subject vehicle will not be exhibited.

When vehicle behavior of the prediction-subject vehicle does not belong to the probability distribution at non-occurrence of the specific vehicle behavior, the probability that the vehicle will not exhibit the specific vehicle behavior is low, and it is difficult to predict that the vehicle will not exhibit the specific vehicle behavior. Even if the vehicle behavior of the prediction-subject vehicle belongs to the probability distribution at non-occurrence of the specific vehicle behavior, if the vehicle behavior also belongs to the probability distribution at occurrence of the specific vehicle behavior, it is expected that the vehicle behavior will be exhibited and that the vehicle behavior will not be exhibited, and it is difficult to predict that the vehicle will not exhibit specific vehicle behavior.

Hence, as shown in the above-described configuration and method, when a relative positional relationship of vehicle behavior of the prediction-subject vehicle does not belong to the probability distribution at non-occurrence of the specific vehicle behavior, it is determined that it is indeterminable whether the vehicle will not exhibit specific vehicle behavior. Similarly, also when the relative positional relationship belongs to the probability distribution at non-occurrence of the specific vehicle behavior and the probability distribution at occurrence of the specific vehicle behavior, it is determined that it is indeterminable whether the vehicle will not exhibit specific vehicle behavior. According to this, under a situation where it is doubtful that the prediction-subject vehicle will not exhibit the specific vehicle behavior, it is determined that it is indeterminable whether the vehicle will not exhibit the specific vehicle behavior, and it is possible to provide information other than a prediction result whether the vehicle behavior will be exhibited or not.

According to one aspect of the present invention, when a relative positional relationship of vehicle behavior of the prediction-subject vehicle belongs to the probability distribution at occurrence of the specific vehicle behavior and does not belong to the probability distribution at non-occurrence of the specific vehicle behavior, the vehicle behavior prediction unit predicts that the prediction-subject vehicle will exhibit corresponding vehicle behavior.

According to one aspect of the present invention, in the predicting step, when a relative positional relationship of vehicle behavior of the prediction-subject vehicle belongs to the probability distribution at occurrence of the specific vehicle behavior and does not belong to the probability distribution at non-occurrence of the specific vehicle behavior, it is predicted that the prediction-subject vehicle will exhibit corresponding vehicle behavior.

When the vehicle behavior of the prediction-subject vehicle belongs to the probability distribution at occurrence of the specific vehicle behavior, there is a tendency that the vehicle will exhibit the specific vehicle behavior. When the vehicle behavior of the prediction-subject vehicle does not belong to the probability distribution at non-occurrence of the specific vehicle behavior, the probability that the vehicle will not exhibit the specific vehicle behavior is low. That is, the probability that the vehicle will exhibit the specific vehicle behavior is high.

As shown in the above-described configuration or method, the vehicle behavior prediction device predicts that the prediction-subject vehicle will exhibit the corresponding vehicle behavior under the condition that the relative positional relationship of the vehicle behavior of the prediction-subject vehicle belongs the probability distribution at occurrence of the specific vehicle behavior and that the relative positional relationship does not belong to the probability distribution at non-occurrence of the specific vehicle behavior. According to this, it is possible to accurately predict that the prediction-subject vehicle will exhibit the corresponding vehicle behavior based on the opposed probability distributions.

According to one aspect of the present invention, when a relative positional relationship of vehicle behavior of the prediction-subject vehicle does not belong to the probability distribution at occurrence of the specific vehicle behavior or belongs to both the probability distribution at occurrence of the specific vehicle behavior and the probability distribution at non-occurrence of the specific vehicle behavior, the vehicle behavior prediction unit determines that it is indeterminable whether the prediction-subject vehicle will exhibit corresponding vehicle behavior.

According to one aspect of the present invention, in the predicting step, when a relative positional relationship of vehicle behavior of the prediction-subject vehicle does not belong to the probability distribution at occurrence of the specific vehicle behavior or belongs to both the probability distribution at occurrence of the specific vehicle behavior and the probability distribution at non-occurrence of the specific vehicle behavior, it is determined that it is indeterminable whether the prediction-subject vehicle will exhibit corresponding vehicle behavior.

When the vehicle behavior of the prediction-subject vehicle does not belong to the probability distribution at occurrence of the specific vehicle behavior, the probability that the vehicle will exhibit the specific vehicle behavior is low, and it is difficult to predict that the vehicle will exhibit the specific vehicle behavior. Even if the vehicle behavior of the prediction-subject vehicle belongs to the probability distribution at occurrence of the specific vehicle behavior, if the vehicle behavior belongs also to the probability distribution at non-occurrence of the specific vehicle behavior, it is expected both that the vehicle behavior will be exhibited and that the vehicle behavior will not be exhibited, and it is difficult to predict that the vehicle will exhibit specific vehicle behavior.

Hence, as shown in the above-described configuration and method, when the relative positional relationship of vehicle behavior of the prediction-subject vehicle does not belong to the probability distribution at occurrence of the specific vehicle behavior, it is determined that it is indeterminable whether the vehicle will exhibit the specific vehicle behavior. Similarly, also when the relative positional relationship belongs to the probability distribution at occurrence of the specific vehicle behavior and the probability distribution at non-occurrence of the specific vehicle behavior, it is determined that it is indeterminable whether the vehicle will exhibit the specific vehicle behavior. According to this, under a situation where it is doubtful that the prediction-subject vehicle will exhibit the specific vehicle behavior, it is determined that it is indeterminable whether the vehicle will exhibit the specific vehicle behavior, and it is possible to provide information other than a prediction result whether the vehicle behavior will be exhibited or not.

According to one aspect of the present invention, the vehicle behavior is deceleration behavior of the vehicle, and the distribution calculating unit collects information representing traveling speed and acceleration of the vehicle as the traveling state information, and obtains a plurality of kinds of probability distributions for each of the collected traveling speed and acceleration of the vehicle. Further, the vehicle behavior prediction unit predicts non-occurrence of the vehicle behavior using the probability distribution based on the traveling speed and predicts occurrence of the vehicle behavior using the probability distribution based on the acceleration.

According to one aspect of the present invention, deceleration behavior of a vehicle is selected as the vehicle behavior, and in the distribution calculating step, information representing traveling speed and acceleration of the vehicle is collected as the traveling state information, and a plurality of kinds of probability distributions are obtained for each of the collected traveling speed and acceleration of the vehicle. Further, in the predicting step, non-occurrence of the vehicle behavior is predicted using a probability distribution based on traveling speed, and occurrence of the vehicle behavior is predicted using a probability distribution based on acceleration.

If deceleration behavior occurs in a certain vehicle, the probability that traffic jam will be generated or a traffic element that requires a specific driving operation such as an intersection, a curve and a temporary stop position exists forward in the traveling direction is high. Under such a situation, to smoothly reduce traveling speed of the vehicle or to maintain the distance from a vehicle in front in accordance with the traffic element that requires deceleration, necessity for urging the driver of the vehicle following the vehicle in which deceleration behavior is predicted to carry out decelerating operation is high. That is, to realize smooth decelerating operation or to carry out deceleration assistance for enhancing fuel economy, necessity to predict deceleration behavior of the prediction-subject vehicle is high. Here, deceleration behavior, traveling speed and acceleration are strongly linked to each other, and based on the probability distributions of the traveling speed and acceleration, it is possible to predict occurrence of the deceleration behavior.

In this aspect, according to the above-described configuration or method, occurrence of deceleration behavior is predicted based on the probability distributions of traveling speed and acceleration, and it is possible to accurately predict deceleration behavior having high necessity of prediction.

According to one aspect of the present invention, the distribution calculating unit further includes a reliability zone defining unit, which defines a predetermined zone from a center of the probability distribution representing an average value of the vehicle behavior as a reliability zone concerning occurrence probability of the vehicle behavior. The vehicle behavior prediction unit predicts vehicle behavior of the prediction-subject vehicle using the probability distribution in the reliability zone.

According to one aspect of the present invention, the vehicle behavior prediction method includes a defining step of defining a predetermined zone from a center of the probability distribution representing an average value of the vehicle behavior as a reliability zone concerning occurrence probability of the vehicle behavior. In the predicting step, the vehicle behavior is predicted using the probability distribution in the reliability zone as the probability distribution.

Even if behavior of a certain vehicle belongs to the probability distribution concerning specific vehicle behavior, the probability of occurrence of the vehicle behavior differs depending upon a relative positional relationship between the probability distribution and behavior of that vehicle, and reliability of a prediction result also differs.

Thereupon, as shown in the above-described configuration or method, if a reliability zone of the probability distribution is previously defined and vehicle behavior of the prediction-subject vehicle is predicted using the probability distribution in the reliability zone, it is possible to further enhance the reliability of the prediction result. If the probability distribution in the previously defined reliability zone is used, when vehicle behavior is predicted, it is only necessary to determine whether behavior of the prediction-subject vehicle belongs to the probability distribution in the reliability zone. Hence, it is possible to more easily predict vehicle behavior.

According to one aspect of the present invention, the distribution calculating unit further includes a reliability zone defining unit, which defines a predetermined zone from a center of the probability distribution representing an average value of the vehicle behavior as a reliability zone concerning occurrence probability of the vehicle behavior. The vehicle behavior prediction unit determines whether vehicle behavior of the prediction-subject vehicle belongs to the probability distribution based on whether the vehicle behavior belongs to the reliability zone of the probability distributions.

According to one aspect of the present invention, the vehicle behavior prediction method includes a defining step of defining a predetermined zone from a center of the probability distribution representing an average value of the vehicle behavior as a reliability zone concerning occurrence probability of the vehicle behavior. In the predicting step, it is determined whether vehicle behavior of a prediction-subject vehicle belongs to the probability distribution based on whether the vehicle behavior belongs to the reliability zone of the probability distributions.

Even if behavior of a certain vehicle belongs to the probability distribution concerning specific vehicle behavior, the probability of occurrence of the vehicle behavior differs depending upon a relative positional relationship between the probability distribution and behavior of that vehicle, and reliability of a prediction result also differs. Even if behavior of the prediction-subject vehicle is included in the probability distribution, if the behavior does not belong to the reliability zone of the probability distribution, the probability that vehicle behavior represented by the probability distribution occurs in the prediction-subject vehicle is low.

Hence, as shown in the above-described configuration or method, a reliability zone concerning the obtained probability distribution is defined, and vehicle behavior of the prediction-subject vehicle is predicted based on whether the vehicle behavior of the prediction-subject vehicle belongs to the reliability zone of the obtained probability distribution. According to this, the probability that a prediction result and behavior of the prediction-subject vehicle match with each other is preferably improved, and reliability of the prediction result is preferably improved. According to this, prediction having high reliability is realized only by defining the reliability zone in the probability distribution in an ex post manner without especially processing the obtained probability distribution.

According to one aspect of the present invention, information concerning at least one of a traveling location of a vehicle and a characteristic of the traveling location is included in the traveling state information, and the distribution calculating unit obtains the plurality of kinds of probability distributions for each of the traveling location or the characteristic of the traveling location. Further, when the vehicle behavior prediction unit predicts the vehicle behavior, the vehicle behavior prediction unit identifies a traveling location of the prediction-subject vehicle or a characteristic of the traveling location, and uses, for predicting the vehicle behavior, a plurality of kinds of probability distributions obtained by the distribution calculating unit concerning a traveling location or a characteristic of the traveling location that is common with the result of the identification.

According to one aspect of the present invention, information representing at least one of a traveling location of a vehicle and a characteristic of the traveling location is selected as the traveling state information. In the distribution calculating step, the plurality of kinds of probability distributions are obtained for the traveling location or the characteristic of the traveling location. The predicting step further includes an identifying step of identifying a traveling location of a prediction-subject vehicle or a characteristic of the traveling location, and a selecting step of selecting, from probability distributions obtained in the distribution calculating step, a plurality of kinds of probability distributions concerning a traveling location or a characteristic of the traveling location that is common with a determination result of the determination step. The probability distributions selected in the selecting step is used for predicting the vehicle behavior.

Since there are many vehicle behavior phenomena that are attributable to a traffic element such as an intersection and a curve existing on a road, there is a tendency that specific vehicle behavior occurs at a specific traveling location. Hence, if it is possible to identify a traveling location of the prediction-subject vehicle, it is possible to previously identify the occurrence probability of vehicle behavior at the traveling location.

Hence, as shown in the above-described configuration or method, information sets representing traveling locations are also collected, and the collected information sets representing the traveling locations are associated with corresponding probability distributions. When vehicle behavior is predicted, a traveling location of a prediction-subject vehicle is determined, and the probability distribution of a location that is common with the determined traveling location is identified. Vehicle behavior is predicted based on this identified probability distribution and behavior of the prediction-subject vehicle. According to this, it is possible to predict vehicle behavior using the probability distribution that is highly relevant to the corresponding traveling location, and prediction accuracy using the probability distribution is further improved. If traveling locations and their characteristics are associated with the probability distributions, it is possible to also predict whether vehicle behavior has occurred due to the traveling location or its characteristics or the vehicle behavior has occurred due to a traveling state of the vehicle that is different from the traveling location or its characteristics.

Even if the traveling locations are different from each other, if elements that exert an influence on vehicle behavior such as a shape of an intersection, a line shape of a road, a road width, the number of lanes, a curvature of a road, a gradient of a road, presence or absence of an infrastructure device such as a traffic light, presence or absence of traffic control such as temporary stop position are common with or similar to each other, there is a tendency that common or similar vehicle behavior occurs.

Hence, as shown in the above-described configuration or method, information sets representing characteristics of traveling locations are appropriately associated with probability distributions. When vehicle behavior is predicted, characteristics of traveling locations of a prediction-subject vehicle are determined, the probability distribution that is formed based on a traveling location having characteristics that are common with this traveling location is identified, and behavior of the prediction-subject vehicle is predicted using this identified probability distribution. According to this, even if the probability distribution at a location matching with a traveling location of the prediction-subject vehicle does not exist, if probability distribution that is formed based on a location that is common with or similar to the characteristics of that location exists, it is possible to predict vehicle behavior using this probability distribution. Hence, aspects capable of predicting vehicle behavior are largely increased, and it is possible to predict vehicle behavior in a greater number of situations.

According to one aspect of the present invention, the traveling state information is acquired based on information sent from a plurality of vehicles each having a wireless communication function to a management center of a probe information communication system. At least one of the distribution calculating unit and the vehicle behavior prediction unit is provided in the management center. Information representing at least one of the probability distribution and a prediction result of vehicle behavior of the prediction-subject vehicle is provided from the management center as requested.

Normally, information sets representing traveling states and traveling positions of a plurality of vehicles traveling on roads are summed up in the management center of the probe information communication system. That is, sufficient information sets that are necessary for forming the probability distributions are summed up in the management center.

If information sets of traveling states are acquired based on information sent to the management center as in the above-described configuration, it is possible to easily collect information that is necessary for predicting vehicle behavior from a plurality of vehicles, and it is possible to form probability distributions and to predict vehicle behavior in a wide area. According to this, it is possible to predict vehicle behavior using an abundance of probability distributions, and aspects capable of predicting vehicle behavior are increased.

According to this configuration, at least one of a distribution calculating unit and a vehicle behavior prediction unit is provided in the management center. Hence, it is possible to form the probability distribution and to predict vehicle behavior exclusively by the management center, and it becomes easy to provide the management center with a sophisticated computing processing device and a high-capacity database. According to this, it is possible to form the probability distribution and predict vehicle behavior fast and accurately, and a large amount of formed probability distributions can be registered in the database.

To achieve the foregoing objectives, the present invention also provides a driving assistance device for assisting a driving operation of a driver based on a prediction result of vehicle behavior. The driving assistance device includes a driving assistance unit that predicts vehicle behavior of a vehicle to be assisted in the driving operation or a vehicle in front traveling in front of the vehicle in the traveling direction using the above described vehicle behavior prediction device, and executes driving assistance based on the predicted vehicle behavior.

According to the above-described aspect, the present invention is especially effectively applied to a driving assistance device that predicts forward elements in the traveling direction of a vehicle that is a subject of driving assistance, and assists a driving operation based on a prediction result. That is, when deceleration of a vehicle in front is predicted, deceleration assistance is carried out by audio assist, image assistance or regenerative brake, and when deceleration of the vehicle in front is not predicted, deceleration assistance is not carried out. According to this, the driving operation is assisted based on an accurate prediction result, and it is possible to reliably assist a driving operation in accordance with behavior and a traveling environment of a prediction-subject vehicle.

To achieve the foregoing objective, the present invention further provides a vehicle behavior prediction device for predicting vehicle behavior based on traveling state information representing a traveling state of a vehicle. The vehicle behavior prediction device includes a calculating unit and a vehicle behavior prediction unit. The calculating unit collects the traveling state information and calculates to form two vehicle behavior patterns representing opposed vehicle behavior based on the collected traveling state information. The vehicle behavior prediction unit, which predicts vehicle behavior of a prediction-subject vehicle through pattern matching between vehicle behavior of the prediction-subject vehicle and the two vehicle behavior patterns.

According to this configuration, vehicle behavior is predicted through matching between opposed two vehicle behavior patterns. According to this, it is possible to predict vehicle behavior from two viewpoints, i.e., opposed two vehicle behavior patterns, and it is possible to accurately predict vehicle behavior based on the respective vehicle behavior patterns.

According to one aspect of the present invention, a. when vehicle behavior of the prediction-subject vehicle matches with a vehicle behavior pattern of specific vehicle behavior and does not match with a vehicle behavior pattern that is opposed to the specific vehicle behavior, the vehicle behavior prediction unit predicts that the prediction-subject vehicle will exhibit vehicle behavior that follows the matched vehicle behavior pattern, and b. when vehicle behavior of the prediction-subject vehicle matches with the opposed two vehicle behavior patterns, the vehicle behavior prediction unit determines that vehicle behavior of the vehicle is indeterminable.

According to the above-described configuration, when traveling speed of the prediction-subject vehicle of vehicle behavior matches with a vehicle behavior pattern representing occurrence of specific vehicle behavior and does not match with the vehicle behavior pattern that is opposed to the former vehicle behavior pattern, i.e., does not match with vehicle behavior pattern representing non-occurrence of the specific vehicle behavior, the vehicle behavior prediction device predicts that the specific vehicle behavior occurs in this vehicle. Similarly, according to this configuration, traveling speed of the prediction-subject vehicle of the vehicle behavior matches with the vehicle behavior pattern representing non-occurrence of the specific vehicle behavior and does not match with the vehicle behavior pattern that is opposed to the former vehicle behavior pattern, i.e., does not match with the vehicle behavior pattern representing occurrence of the specific vehicle behavior, the vehicle behavior prediction device predicts that the specific vehicle behavior is not occurring in this vehicle. Hence, when behavior of the prediction-subject vehicle only matches with one of the opposed two vehicle behavior patterns, the device does not predict that the behavior of the vehicle matches with the matching vehicle behavior. According to this, it is possible to reliably predict vehicle behavior using two vehicle behavior patterns.

Further, according to the above-described configuration, when traveling speed of the prediction-subject vehicle of vehicle behavior matches with both the opposed two vehicle behavior patterns, it is determined that the probability that behavior of the vehicle matches with any of the vehicle behavior patterns, and it is determined that behavior of the vehicle is indeterminable. According to this, it is possible to predict vehicle behavior in three stages, i.e., occurrence, non-occurrence and indetermination of specific vehicle behavior.

BRIEF DESCRIPTION OF THE DRAWINGS

FIG. 2(a) is a graph showing one example of a probability distribution concerning traveling speed in a location that is separated away from an intersection by a predetermined distance;

FIG. 2(b) is a graph showing one example of a probability distribution concerning acceleration in a location that is separated away from the intersection by a predetermined distance;

FIG. 3 is a graph showing one example of a probability distribution concerning traveling speed in a predetermined traveling zone before an intersection;

FIG. 5 is a flowchart representing one example of database forming processing of the embodiment;

FIG. 6 is a flowchart representing one example of prediction information acquiring processing and vehicle behavior predicting processing of the embodiment;

FIG. 10 is a graph showing one example of a probability distribution concerning traveling speed in a location that is separated away from an intersection by a predetermined distance at the time of deceleration and at the time of non-deceleration together with a reliability zone;

FIG. 11 is a graph showing one example of a probability distribution concerning traveling speed in a location that is separated away from an intersection by a predetermined distance at the time of deceleration and at the time of non-deceleration together with a reliability zone;

FIG. 12 is a graph showing one example of a probability distribution concerning traveling speed in a location that is separated away from an intersection by a predetermined distance at the time of deceleration and at the time of non-deceleration together with a reliability zone;

FIG. 18(a) is a diagram representing a traveling location where predetermined vehicle behavior occurs concerning a vehicle behavior prediction device, a vehicle behavior prediction method and a driving assistance device of another embodiment according to the invention; and FIG. 18(b) is a graph showing a prediction mode of vehicle behavior based on opposed two vehicle behavior patterns.

DETAILED DESCRIPTION OF THE PREFERRED EMBODIMENTS

First Embodiment

A vehicle behavior prediction device, a vehicle behavior prediction method and a driving assistance device according to a first embodiment of the present invention will be described with reference to FIGS. 1 to 8.

Figure 1:
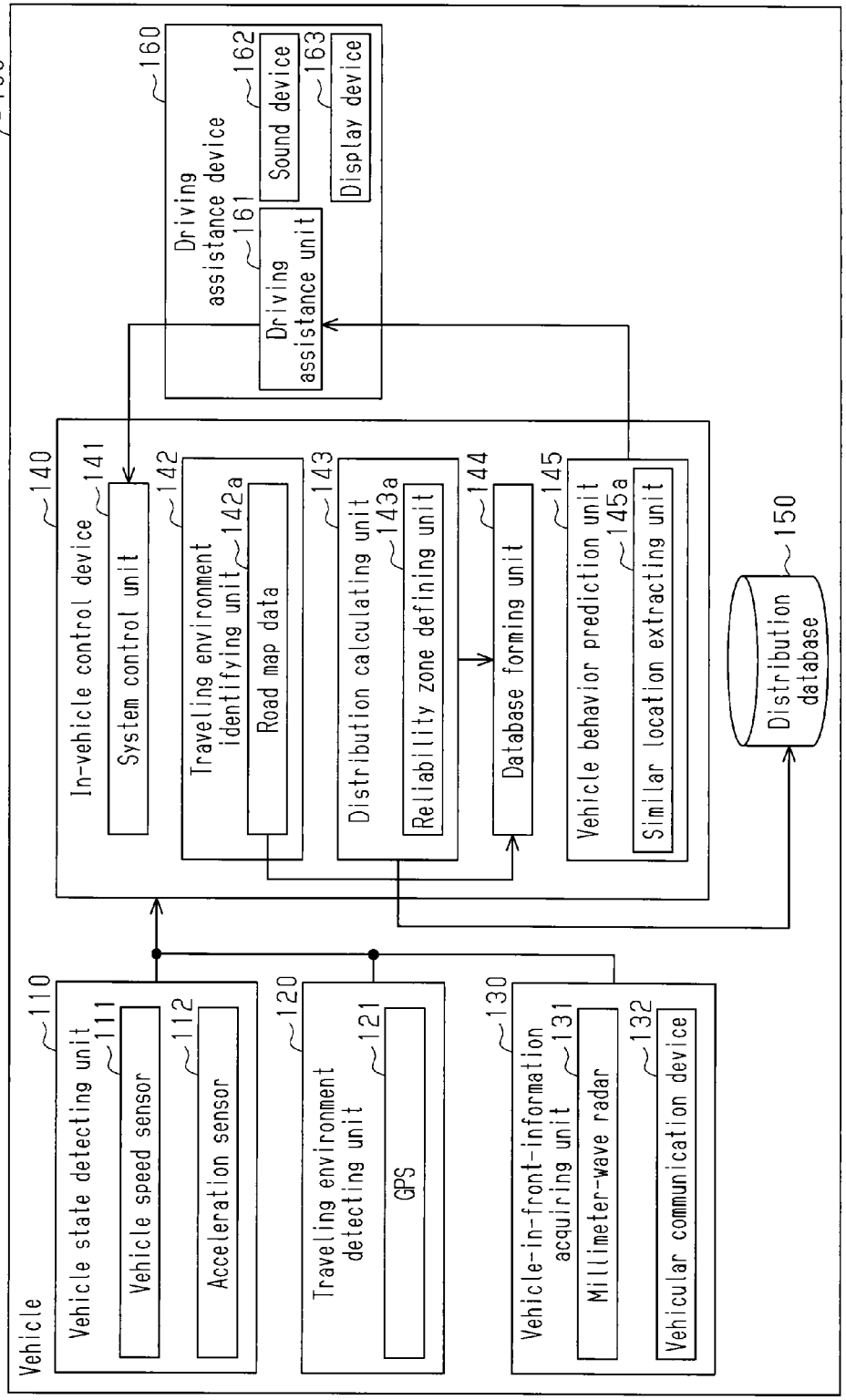
FIG. 1 is a schematic block diagram of a vehicle to which a vehicle behavior prediction device, a vehicle behavior prediction method and a driving assistance device of a first embodiment according to the present invention are applied.

As shown in FIG. 1, the vehicle behavior prediction device, the vehicle behavior prediction method and the driving assistance device of the embodiment are applied to a vehicle 100. The vehicle 100 is provided with a vehicle state detecting unit 110. Of traveling state information, the vehicle 100 detects a traveling state of the vehicle 100 itself.

The vehicle state detecting unit 110 is composed of, for example, a vehicle speed sensor 111, which detects traveling speed of the vehicle 100, and an acceleration sensor 112, which detects acceleration of the vehicle 100. The vehicle speed sensor 111 and the acceleration sensor 112 are electrically connected to an in-vehicle control device 140 through an in-vehicle network such as CAN (Control Area Network). Detection results of various sensors are collected in the in-vehicle control device 140.

The vehicle speed sensor 111 detects wheel rotation speed, and outputs a signal corresponding to the detected rotation speed to the in-vehicle control device 140. The acceleration sensor 112 detects acceleration of the vehicle 100, and outputs a signal corresponding to the detected acceleration to the in-vehicle control device 140.

The vehicle 100 is provided with a traveling environment detecting unit 120. Of traveling state information, the traveling environment detecting unit 120 detects a traveling position and traveling environment of the vehicle 100 itself. The traveling environment detecting unit 120 of this embodiment is composed of, for example, a GPS 121. The GPS 121 receives a satellite signal, and detects an absolute position, i.e., the latitude and longitude of the vehicle 100 based on the received satellite signal. The GPS 121 detects the latitude and longitude of the vehicle 100, which are changed as the vehicle 100 moves, i.e., detects the latitude and longitude of various locations where the vehicle 100 travels, and outputs the latitude and longitude information representing a detection result to the in-vehicle control device 140.

The vehicle 100 is provided with a vehicle-in-front-information acquiring unit 130, which acquires information representing a traveling state and the like of a vehicle in front, which travels in front of the vehicle 100 in the traveling direction. The vehicle-in-front-information acquiring unit 130 of the embodiment includes a millimeter-wave radar 131, which detects existence of a vehicle in front, which travels in front of the vehicle 100 in the traveling direction using radio wave of millimeter wave band for example. The vehicle-in-front-information acquiring unit 130 includes a vehicular communication device 132, which performs vehicle-to-vehicle communication with a vehicle that travels near the vehicle 100, and performs road-to-vehicle communication with a road-side communication device provided on a road. Vehicles in front include not only one vehicle that travels just in front of the vehicle 100 but also a plurality of vehicles that travel in front of the vehicle 100 in the traveling direction.

If the millimeter-wave radar 131 detects existence of a vehicle in front, which travels in front of the vehicle 100 in the traveling direction, the millimeter-wave radar 131 outputs a signal representing a detection result thereof to the in-vehicle control device 140. The vehicular communication device 132 acquires information representing a traveling state such as traveling speed and acceleration of the vehicle in front through the vehicle-to-vehicle communication with the vehicle in front, which travels in front of the vehicle 100 in the traveling direction. The vehicular communication device 132 outputs this acquired information to the in-vehicle control device 140.

The in-vehicle control device 140 includes a system control unit 141. The system control unit 141 controls various kinds of in-vehicle devices such as an engine, a brake, a turn lamp, and a steering based on detection results of the vehicle speed sensor 111 and the acceleration sensor 112, which are input from the vehicle state detecting unit 110, and based on detection results of an accelerator sensor, a brake sensor, a steering sensor and the like. The in-vehicle control device 140 of this embodiment includes a traveling environment identifying unit 142. The traveling environment identifying unit 142 identifies traveling environments of the vehicle 100 and a vehicle in front based on the latitude and longitude information of the vehicle 100, which is input from the traveling environment detecting unit 120 and the vehicle-in-front-information acquiring unit 130. Further, the in-vehicle control device 140 of the embodiment includes a distribution calculating unit 143, a database forming unit 144 and a vehicle behavior prediction unit 145, which are provided for predicting vehicle behavior of a vehicle to be predicted (prediction-subject vehicle, hereinafter).

Among them, if detection results of the driving operation elements are input to the system control unit 141 from the vehicle state detecting unit 110, the system control unit 141 controls the various kinds of in-vehicle devices based on the detection results. According to this, if the driver depresses an accelerator pedal and the detection result of the accelerator sensor or the like is changed, a control amount of the engine is calculated in accordance with this detection result, and the engine is controlled in accordance with this calculation result.

If the latitude and longitude information of the vehicle 100 is input to the traveling environment identifying unit 142 of this embodiment from the traveling environment detecting unit 120 and the vehicle-in-front-information acquiring unit 130, the traveling environment identifying unit 142 outputs this input the latitude and longitude information to the distribution calculating unit 143. The traveling environment identifying unit 142 of this embodiment includes road map data 142*a* in which a road line shape, an intersection shape and a road gradient are previously registered together with the latitude and longitude information that represent their latitudes. If the latitude and longitude information of the vehicle 100 or a vehicle in front is input to the traveling environment identifying unit 142, the traveling environment identifying unit 142 refers to the road map data 142*a* based on this latitude and longitude information, and identifies traveling environments of the vehicle 100 and the vehicle in front. The traveling environment identifying unit 142 of this embodiment identifies characteristics of traveling locations where the vehicle 100 and the vehicle in front travel for example. The traveling environment identifying unit 142 outputs a result of this specification to the distribution calculating unit 143. Characteristics of this traveling location are elements that exert influence on vehicle behavior such as a shape of an intersection, a road line shape, a road width, the number of lanes, a curvature of a road, a road gradient, presence or absence of an infrastructure device such as a traffic light, presence or absence of traffic restriction such as a temporary stop position and a speed limit.

If information representing traveling speed and acceleration of the vehicle 100 and the vehicle-in-front-information acquiring unit 130 is input to the distribution calculating unit 143 from the vehicle state detecting unit 110 and the vehicle-in-front-information acquiring unit 130, the distribution calculating unit 143 associates the information representing the traveling speed and acceleration with the latitude and longitude of the vehicle 100 when the traveling speed and acceleration are detected and positional information representing an absolute position in a traffic element. If the number of times of acquiring information representing traveling speed and acceleration exceeds a predetermined number, the distribution calculating unit 143 forms a probability distribution of vehicle behavior based on the information that represents traveling speed and acceleration. In this embodiment, as the number of times of acquiring information representing traveling speed and acceleration that is required for forming the probability distribution, about 20 times is defined in a location that is the same as or similar to traveling environment, for example. The distribution calculating unit 143 of this embodiment forms the probability distributions of vehicle behavior for each of traveling locations that are classified based on latitude and longitude and for each of traveling environments identified by the traveling environment identifying unit 142.

The distribution calculating unit 143 of this embodiment includes a reliability zone defining unit 143a, which defines a reliability zone of the formed probability distribution. As the reliability zone, the reliability zone defining unit 143a of this embodiment defines about 95% of the probability distributions including the center thereof as the reliability zone for example.

The distribution calculating unit 143 of this embodiment forms probability distributions of traveling speed and acceleration only in a location or traveling environment where a transition pattern of traveling speed or acceleration such as an intersection and a curve is divided into a plurality of patterns.

If the distribution calculating unit 143 forms probability distributions concerning the traveling speed and acceleration in this manner, the distribution calculating unit 143 appropriately outputs data representing the formed probability distribution to the database forming unit 144.

If the data representing probability distributions formed by the distribution calculating unit 143 is input to the database forming unit 144, the database forming unit 144 registers each of the probability distributions in a distribution database 150 for each of traveling locations and traveling environments. According to this, data representing probability distributions is accumulated in the distribution database 150 for each of locations and traveling environments of the vehicle 100 and vehicles in front.

If the vehicle behavior prediction unit 145 recognizes that a vehicle in front exits in front of the vehicle 100 in the traveling direction based on information that is input from the vehicle-in-front-information acquiring unit 130 for example, the vehicle behavior prediction unit 145 predicts vehicle behavior of this vehicle in front. When the vehicle behavior prediction unit 145 of this embodiment predicts vehicle behavior, the vehicle behavior prediction unit 145 acquires information representing traveling speed and acceleration of the vehicle in front, which is traveling in front of the vehicle 100 from the vehicle-in-front-information acquiring unit 130. The vehicle behavior prediction unit 145 identifies a traveling location of the vehicle in front based on the latitude and longitude information of the vehicle 100 acquired by the GPS 121 and a detection result of the millimeter-wave radar 131. The vehicle behavior prediction unit 145 extracts, from the distribution database 150, probability distributions concerning traveling speed and acceleration formed in a location where the latitude and longitude are common based on the specified traveling location of the vehicle in front. Next, the vehicle behavior prediction unit 145 predicts vehicle behavior of the vehicle in front based on a relative positional relationship of the traveling speed and acceleration of the vehicle in front with respect to probability distributions of the extracted traveling speed and acceleration. The vehicle behavior prediction unit 145 of this embodiment predicts presence or absence of occurrence of deceleration behavior as vehicle behavior of the vehicle in front for example. When the vehicle behavior prediction unit 145 of this embodiment cannot predict with high probability that deceleration behavior of the vehicle in front occurs or is not occurring, the vehicle behavior prediction unit 145 determines that deceleration behavior is indeterminable.

The vehicle behavior prediction unit 145 of this embodiment includes a similar location extracting unit 145a, which extracts, from the distribution database 150, probability distributions formed in an environment similar to the traveling environment of the prediction-subject vehicle in front. When probability distributions concerning traveling speed and acceleration formed at a location where the latitude and longitude are common does not exist in the distribution database 150, the similar location extracting unit 145a extracts, from the distribution database 150, probability distributions concerning traveling speed and acceleration formed in an environment where an intersection shape, a road line shape and a curvature of a curve are similar. In this embodiment, probability distributions concerning the extracted traveling speed and acceleration are also used for predicting vehicle behavior of the vehicle in front. According to this, in this embodiment, it is also possible to predict vehicle behavior of a vehicle in front traveling in a traveling location that is not yet registered in the distribution database 150. If the vehicle behavior prediction unit 145 predicts vehicle behavior of the vehicle in front in this manner, the vehicle behavior prediction unit 145 outputs a prediction result to a driving assistance unit 160, which assists various kinds of driving operations based on the prediction result.

The driving assistance unit 160 of this embodiment includes a driving assistance unit 161, which calculates control amounts for controlling various kinds of control devices such as the engine and the brake provided in the vehicle 100, a sound device 162 and a display device 163 provided in a passenger room based on a prediction result of the vehicle behavior prediction unit 145.

If a prediction result of vehicle behavior of the vehicle in front is input to the driving assistance unit 161 from the vehicle behavior prediction unit 145, the driving assistance unit 161 obtains the control amounts of the various kinds of control devices controlled by the system control unit 141 based on the prediction result for example, and outputs the obtained control amounts to the system control unit 141. According to this, when a prediction result of the vehicle behavior prediction unit 145 represents occurrence of deceleration behavior of the vehicle in front for example, the engine is turned off or the brake is turned on when or before the vehicle in front decelerates. When the vehicle 100 is a hybrid car, the driving assistance unit 161 executes regenerative brake when or before the vehicle in front decelerates. The driving assistance unit 161 produces sound data and image data for audio assistance or image assistance to inform deceleration behavior of the vehicle in front for example, and the driving assistance unit 161 outputs the produced sound data and image data to the sound device 162 and the display device 163 when or before the vehicle in front decelerates. According to this, guide for urging a driver of the vehicle 100 to decelerate the vehicle 100 is carried out through the sound device 162 and the display device 163 when or before the vehicle in front decelerates.

On the other hand, when the prediction result of the vehicle behavior prediction unit 145 shows that deceleration behavior of the vehicle in front is not occurring, the driving assistance unit 161 does not execute deceleration assistance through the system control unit 141, the sound device 162 and the display device 163. The driving assistance unit 161 informs the driver through the sound device 162 and the display device 163 that the vehicle in front will not decelerate. Similarly, also when a determination result that vehicle behavior of the vehicle in front is indeterminable is input to the driving assistance unit 161 of this embodiment from the vehicle behavior prediction unit 145, the driving assistance unit 161 does not execute the deceleration assistance through the system control unit 141, the sound device 162 and the display device 163.

In this embodiment, only when the probability that a vehicle in front will decelerate is high, deceleration assistance for a driver is carried out. In this embodiment, when the probability that the vehicle in front will not decelerate is high, the driver is informed that the vehicle in front will not decelerate. According to this, deceleration assistance for a driver is carried out only under a situation having high necessity, and when the probability that a vehicle in front will not decelerate is high, the driver is informed that a traveling state of the vehicle in front is continued.

Figure 4:
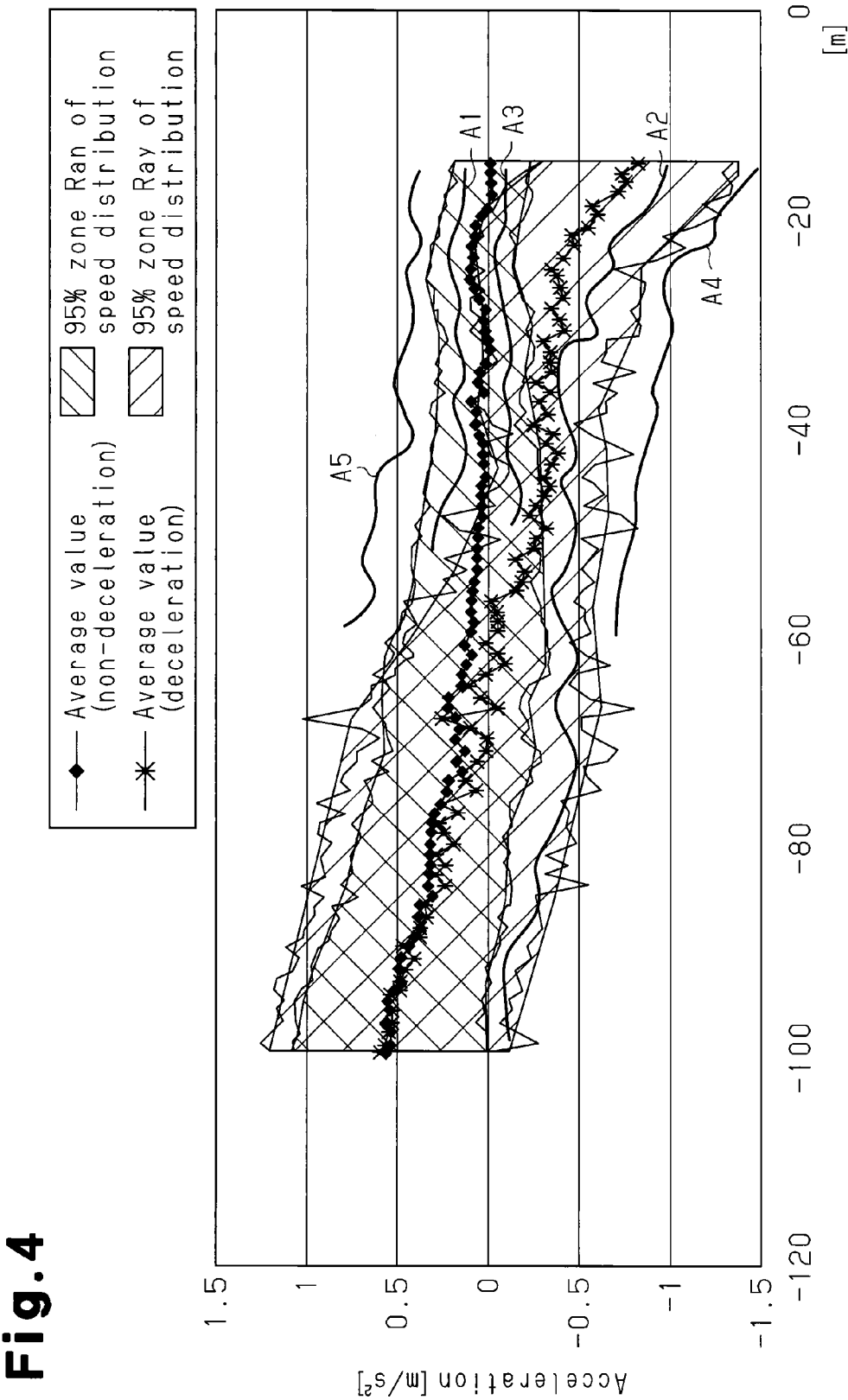
FIG. 4 is a graph showing one example of a probability distribution concerning acceleration in a predetermined traveling zone before an intersection.

A prediction principle of vehicle behavior of the vehicle behavior prediction device, the vehicle behavior prediction method and the driving assistance device of this embodiment will be described with reference to FIGS. 2 to 4. FIG. 2(a) shows the probability distribution of traveling speed of about 40 m short of an intersection where a traffic light is provided for example, and FIG. 2(b) shows the probability distribution of acceleration of about 40 m short of the intersection for example. FIG. 3 shows, at about 1 m intervals, probability distributions of traveling speed of a vehicle that travels through a certain intersection, and FIG. 4 shows, at about 1 m intervals, probability distributions of acceleration of a vehicle that travels through the intersection. In FIG. 3, distribution Rvy represents the probability distribution of the traveling speed of the vehicle from about 100 m short of the intersection to the intersection when deceleration behavior occurs, and distribution Rvn represents the probability distribution of the traveling speed of the vehicle from about 100 m short of the intersection to the intersection when deceleration behavior is not occurring. Similarly, in FIG. 4, distribution Ray represents the probability distribution of the acceleration of the vehicle from about 100 m short of the intersection to the intersection when deceleration behavior occurs, and distribution Ran represents the probability distribution of the acceleration of the vehicle from about 100 m short of the intersection to the intersection when deceleration behavior is not occurring.

As shown in FIG. 2(a), probability distributions of traveling speed of the vehicle 100 or the vehicle in front at a location of about 40 m short of the intersection are two distributions, i.e., the distribution Pvy when deceleration behavior is carried out due to red phase of the traffic light at the intersection and the distribution Pvn when the deceleration behavior is not carried out at the intersection. In this embodiment, regions Ovy and Ovn are defined as a 95% reliability zone of an average value of the distributions Pvy and Pvn.

As shown in FIG. 2(b), probability distributions of acceleration of the vehicle 100 or a vehicle in front at a location of about 40 m short of the intersection are two distributions, i.e., the distribution Pay when deceleration behavior is carried out due to red phase of the traffic light at the intersection and the distribution Pan when deceleration behavior is not carried out at the intersection. In this embodiment, regions Oay and Oan are defined as a 95% reliability zone of an average value of the distributions Pay and Pan.

As shown in FIG. 3, the distribution of traveling speed of the 95% reliability zone from a location of a predetermined distance short of the intersection to the intersection is roughly classified into the distribution Rvy when the driver of the vehicle has carried out the decelerating operation and the deceleration behavior occurs and the distribution Rvn when the driver of the vehicle has not carried out the decelerating operation and the deceleration behavior is not occurring. These two distributions Rvy and Rvn are not different from each other at a location of about 100 m short of the intersection, but they show different transitions toward the intersection. This is because that when decelerating operation is carried out, traveling speed of the vehicle approaches "0" toward the intersection.

When transition V1 of traveling speed of a prediction-subject vehicle is included in the distribution Rvn at the time of non-deceleration but is not included in the distribution Rvy at the time of deceleration, it is possible to predict that deceleration behavior is not occurring in the vehicle.

When transition V2 of traveling speed of the prediction-subject vehicle is included in the distribution Rvy at the time of deceleration but is not included in the distribution Rvn at the time of non-deceleration, it is possible to predict that deceleration behavior will occur in the vehicle.

When transition V3 of traveling speed of the prediction-subject vehicle is included in both the distributions Rvy and Rvn at the time of deceleration, since deceleration behavior may occur or may not occur in that vehicle, it is determined that vehicle behavior thereafter is indeterminable. Similarly, concerning exceptional transitions V4 and V5, which are not included in any of the distributions Rvy and Rvn at the time of deceleration, it is determined that vehicle behavior thereafter is indeterminable.

On the other hand, as shown in FIG. 4, the distribution of acceleration of the 95% reliability zone from a location of a predetermined distance short of the intersection to the intersection is also roughly classified into the distribution Ray when the driver of the vehicle has carried out the decelerating operation and the deceleration behavior has occurred and the distribution Ran when the driver of the vehicle has not carried out the decelerating operation and the deceleration behavior has not occurred. The rate at which the distribution Ray at the time of deceleration concerning acceleration is superposed on the distribution Ran at the time of non-deceleration is smaller than the rate at which the distribution Rvy at the time of deceleration concerning traveling speed is superposed on the distribution Rvn at the time of non-deceleration even at a location, for example, of about 100 m short of the intersection. This is because since the acceleration is a differential value of the traveling speed, variation in acceleration caused by presence or absence of decelerating operation is generated immediately after the decelerating operation is started.

When transition A1 of traveling speed of the prediction-subject vehicle is included in the distribution Ran at the time of non-deceleration but is not included in the distribution Ray at the time of deceleration, it is possible to predict that deceleration behavior will not occur in this vehicle.

When transition A2 of traveling speed of the prediction-subject vehicle is included in the distribution Ray at the time of deceleration but is not included in the distribution Ran at the time of non-deceleration for example, it is possible to predict that deceleration behavior will occur in that vehicle.

When transition A3 of traveling speed of the prediction-subject vehicle is included in both the distributions Ray and Ran at the time of deceleration, since deceleration behavior may occur or may not occur in that vehicle, it is determined that vehicle behavior thereafter is indeterminable. Similarly, concerning exceptional transitions A4 and A5, which are not included in any of the distributions Ray and Ran at the time of deceleration, it is determined that vehicle behavior thereafter is indeterminable.

As shown in FIG. 4, concerning the distribution of acceleration, most of the distribution Ran at the time of non-deceleration from a location of about 100 m short of the intersection to a location of about 70 m is included in the distribution Ray at the time of deceleration, and the rate at which the distribution Ray at the time of deceleration from the location of about 70 m to the intersection is not superposed on the distribution Ran at the time of non-deceleration is high. The rate at which the distribution Ray at the time of deceleration concerning acceleration is not superposed on the distribution Ran at the time of non-deceleration is higher than the rate at which the distribution Rvy at the time of deceleration concerning traveling speed shown in FIG. 3 is not superposed on the distribution Rvn at the time of non-deceleration. Hence, the vehicle behavior prediction device predicts whether deceleration behavior will occur using the distribution of acceleration shown in FIG. 4.

On the other hand, as shown in FIG. 3, concerning the distributions of traveling speed, the rate at which the distribution Rvy at the time of deceleration and the distribution Rvn at the time of non-deceleration are superposed on each other from about 100 m short of the intersection to a location of about 70 m is high. However, from the location of about 70 m to the intersection, since presence or absence of stop at the intersection are reflected, a region of only the distribution Rvn especially at the time of non-deceleration is enlarged.

A region (area) where the distribution Rvn at the time of non-deceleration concerning traveling speed is not superposed on the distribution Rvy at the time of deceleration is higher than a region (area) where the distribution Ran at the time of non-deceleration concerning acceleration shown in FIG. 4 is not superposed on the distribution Ray at the time of deceleration. Hence, in this embodiment, the vehicle behavior prediction device predicts that deceleration behavior will not occur using the distribution of traveling speed shown in FIG. 3.

As shown in FIGS. 3 and 4, in the distributions concerning acceleration, the difference between a value at the time of deceleration and a value at the time of non-deceleration is greater than that in the distribution concerning traveling speed at a stage far from the intersection. Hence, if the distribution concerning acceleration is used, it is possible to accurately predict vehicle behavior at a stage separated away from the intersection by a predetermined distance or longer.

Next, operation of the vehicle behavior prediction device, the vehicle behavior prediction method and the driving assistance device of this embodiment will be described with reference to FIGS. 5 and 6.

As shown in FIG. 5, according to the in-vehicle control device 140, to form the database used for predicting vehicle behavior, information concerning traveling speed and acceleration representing vehicle behavior when the vehicle 100 and a vehicle in front of the vehicle 100 travel is acquired (step S100). Next, the latitude and longitude information representing a traveling location corresponding to vehicle behavior is acquired each time (step S101). In this example, the latitude and longitude of the vehicle in front are calculated based on the distance between the vehicle 100 and the vehicle in front, which is obtained from a detection result of the millimeter-wave radar 131, with respect to the latitude and longitude of the vehicle 100 based on a detection result of the GPS 121 provided in the vehicle 100. Characteristics of a traveling location corresponding to vehicle behavior is identified each time based on the acquired latitude and longitude information and the road map data 142a (step S102). Information representing the corresponding latitude and longitude information and characteristics of an identified traveling location is associated with the detected vehicle behavior (step S103). Vehicle behavior and a traveling location where the vehicle behavior occurs are repeatedly detected and characteristics of the traveling location are repeatedly identified. According to this, if the amount of information concerning the traveling location and the characteristics of the traveling location exceeds a predetermined number (step S104: YES), probability distributions of vehicle behavior in the traveling location and the characteristics of the traveling location that exceeds the predetermined number are formed (step S105). According to this, probability distributions concerning traveling speed and acceleration shown in FIGS. 3 and 4 are formed for each of traffic elements such as an intersection, a curve and a temporary stop position where a specific driving operation is carried out, and the formed probability distributions are registered in the distribution database 150.

At the time of prediction of vehicle behavior for example, as step S106 shown in FIG. 6, traveling speed, acceleration and a traveling location of a vehicle in front, which travels in front of the vehicle 100 in the traveling direction, representing information to be predicted are detected. Next, if probability distributions at a location that is common with the detected traveling location exists in the distribution database 150 (Step S107: YES), the probability distributions are extracted from the distribution database 150. If probability distributions in a location that is common with the traveling location of the vehicle in front do not exist in the distribution database 150 (Step S107: NO), it is determined whether probability distributions in a location having characteristics that are common with the traveling location of the vehicle in front exist in the distribution database 150 (step S111). If probability distributions in a location having characteristics that are common with the traveling location of the vehicle in front exist in the distribution database 150 (step S111: YES), the probability distributions of that location are extracted from the distribution database 150 (step S112).

If probability distributions of a traveling location of a prediction-subject vehicle in front of vehicle behavior or a location having characteristics that are common with the former location are extracted from the distribution database 150, a relative positional relationship of the vehicle behavior of the vehicle in front in the extracted probability distributions is obtained in modes shown in FIGS. 3 and 4 (step S109).

Based on the relative positional relationship, the vehicle behavior prediction device predicts vehicle behavior of the vehicle in front as follows:

a. deceleration behavior, which is specific vehicle behavior, for example, will occur, b. the deceleration behavior will not occur, or c. it is indeterminable whether the deceleration behavior will occur (steps S110, S113, S114).

If vehicle behavior of the vehicle in front is predicted, driving assistance is executed in accordance with this prediction result. According to this, if the vehicle behavior prediction device predicts that the vehicle in front traveling toward an intersection will carry out deceleration behavior, deceleration guidance or regenerative braking for the driver of the vehicle 100, which follows the vehicle in front, is carried out. If the vehicle behavior prediction device predicts that the vehicle in front will not carry out the deceleration behavior or predicts that vehicle behavior of the vehicle in front is indeterminable, the driver of the vehicle 100 is informed of this fact, and deceleration assistance is not carried out.

Next, the predicting procedure of vehicle behavior to be predicted by the vehicle behavior prediction device, the vehicle behavior prediction method and the driving assistance device of this embodiment will be described in detail with reference to FIGS. 7 and 8. That is, the vehicle behavior predicting processing will be described in detail with reference to the database forming processing and the prediction information acquiring processing shown in FIGS. 5 and 6.

Figures 1, 7:
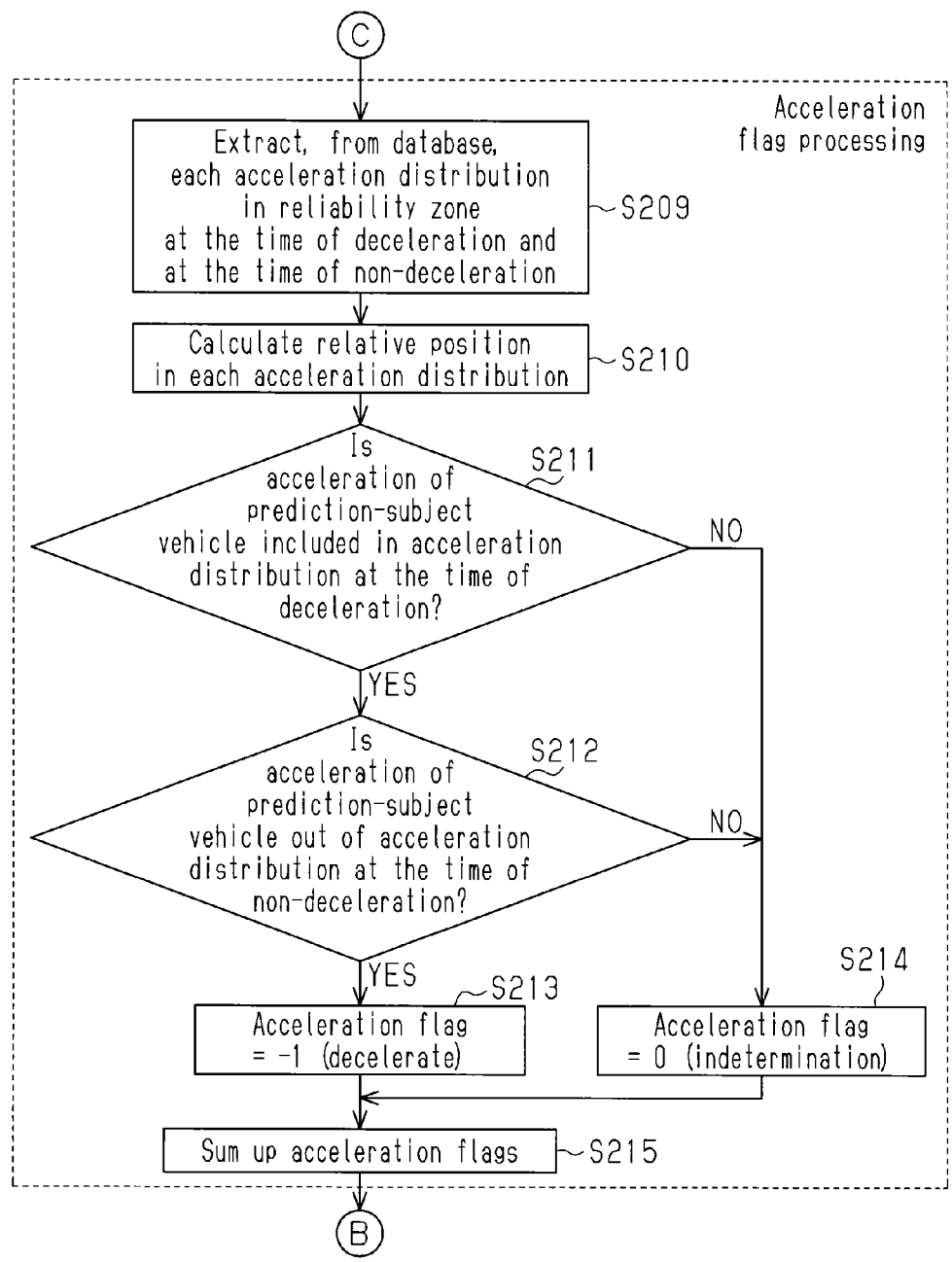
FIG. 7 is a flowchart representing one example of traveling speed flag processing and acceleration flag processing of the embodiment.

As shown in FIG. 7, assume that probability distributions used for predicting vehicle behavior are formed through execution of the database forming processing shown in steps S100 to S105 in FIG. 5 (step S200). Assume that information representing traveling speed, acceleration and a traveling location of a prediction-subject vehicle in front is acquired through execution of the prediction information acquiring processing in steps S106 to S108, S111 and S112, and probability distributions in the traveling location or a location having characteristics that are common with the traveling location are acquired (step S201).

Then, as represented as step S202 in FIG. 7, of the probability distributions registered in the distribution database 150, probability distributions of about 95% reliability of traveling speed at the time of deceleration and at the time of non-deceleration in a certain intersection shown in FIG. 3 are extracted from the distribution database 150. Next, a relative positional relationship, i.e., a relative position of traveling speed of the vehicle in front with respect to the extracted probability distributions of the traveling speed at the time of deceleration and at the time of non-deceleration is obtained (step S203). Then, it is determined whether the traveling speed of the vehicle in front is included in the probability distribution of the traveling speed at the time of non-deceleration (step S204). When this is determined, the traveling speed of the vehicle in front and the probability distribution of the traveling speed from a location of about 40 m short to a location of about 20 m short of the intersection are used.

When the traveling speed of vehicle in front is included in the probability distribution of the traveling speed at the time of non-deceleration (step S204: YES), it is determined whether the traveling speed of the vehicle in front is not included in the probability distribution of the traveling speed at the time of deceleration (step S205). As a result of this determination, if it is determined that the traveling speed of the vehicle in front is included only in the probability distribution of traveling speed at the time of non-deceleration (step S205: YES), the vehicle behavior prediction device predicts that deceleration behavior will not occur in this vehicle in front at the intersection toward which the vehicle in front is traveling, and a traveling speed flag is set to 1 (step S206).

On the other hand, if the traveling speed of the vehicle in front is not included in the probability distribution of traveling speed at the time of non-deceleration (step S204: NO), it is determined whether deceleration behavior of the vehicle in front is indeterminable, and the traveling speed flag is set to "0" (step S207). Similarly, also when the traveling speed of the vehicle in front is included in any of the probability distribution at the time of non-deceleration and the probability distribution at the time of deceleration (step S204: YES, S205: NO), it is determined whether deceleration behavior of the vehicle in front is indeterminable, and a deceleration flag is set to 0 (step S207).

If the traveling speed flag is determined in this manner, a result of this determined traveling speed flag is summed up (step S208).

Next, as represented as step S209, of probability distributions registered in the distribution database 150, probability distributions of about 95% reliability of acceleration at the time of deceleration and at the time of non-deceleration in a certain intersection shown in FIG. 4 for example is extracted from the distribution database 150. Then, a relative positional relationship of acceleration of the vehicle in front with respect to probability distributions of the extracted acceleration at the time of deceleration and at the time of non-deceleration is obtained (step S210). It is determined whether the acceleration of the vehicle in front is included in the probability distribution of acceleration at the time of deceleration (step S211). At the time of this determination also, acceleration of the vehicle in front and the probability distribution of traveling speed from a location of about 40 m short to a location of about 20 m short of the intersection are used.

When acceleration of the vehicle in front is included in the probability distribution of acceleration at the time of deceleration (step S211: YES), it is determined whether the acceleration of the vehicle in front is not included in the probability distribution of acceleration at the time of non-deceleration (step S212). As a result of this determination, if it is determined that the acceleration of the vehicle in front is included only in the probability distribution of acceleration at the time of deceleration (step S212: YES), the vehicle behavior prediction device predicts that deceleration behavior occurs in the vehicle in front at the intersection toward which the vehicle in front is traveling, and the acceleration flag is set to −1 (step S213).

On the other hand, when the acceleration of the vehicle in front is not included in the probability distribution of acceleration at the time of deceleration (step S211: NO), it is determined that the deceleration behavior of the vehicle in front is indeterminable, and the acceleration flag is set to 0 (step S214). Similarly, also when the acceleration of the vehicle in front is included in both the probability distribution at the time of non-deceleration and the probability distribution at the time of deceleration (step S211: YES, S212: NO), it is determined that the deceleration behavior of the vehicle in front is indeterminable, and the deceleration flag is set to 0 (step S214).

If the acceleration flag is determined in this manner, results of the determined acceleration flag are summed up (step S215).

Figure 8:
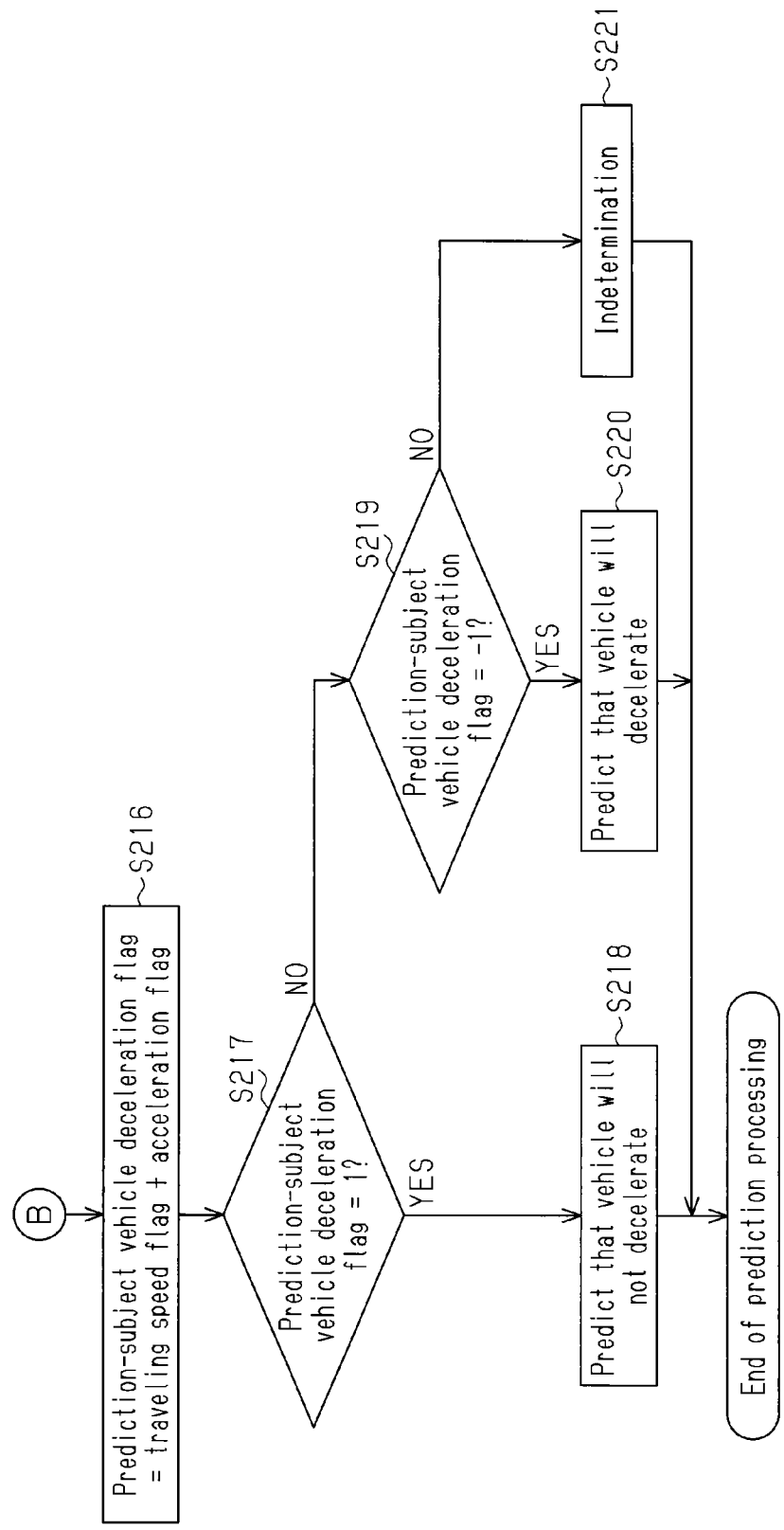
FIG. 8 is a flowchart representing predicting procedure of vehicle behavior of the embodiment.

In next step S216 as shown in FIG. 8, the result of sum of the traveling speed flag and the result of sum of the acceleration flag are added up, and a prediction-subject vehicle deceleration flag representing a prediction value of vehicle behavior of the prediction-subject vehicle in front is obtained. As a result, when the prediction-subject vehicle deceleration flag is 1, it is determined that the vehicle in front will not exhibit deceleration behavior (step S217: YES, S218).

On the other hand, when the prediction-subject vehicle deceleration flag is −1, it is determined that the vehicle in front will exhibit deceleration behavior (step S219: YES, S220).

When the prediction-subject vehicle deceleration flag is 0, it is determined that presence or absence of occurrence of deceleration behavior of the vehicle in front is indeterminable (step S219: NO, S221).

As described above, according to the vehicle behavior prediction device, the vehicle behavior prediction method and the driving assistance device of this embodiment, the following advantages are obtained.

(1) Traveling state information of the vehicle 100 and vehicles in front is collected, and based on the collected traveling state information, a plurality of kinds of probability distributions representing occurrence probability of vehicle behavior is obtained. A relative positional relationship of a plurality of kinds of probability distributions of vehicle behavior of a prediction-subject vehicle (vehicle in front) is obtained, and based on this obtained relative positional relationship, vehicle behavior of the prediction-subject vehicle is predicted. According to this, it is possible to predict vehicle behavior from a plurality of viewpoints using the plurality of kinds of probability distributions, and it is possible to accurately predict vehicle behavior.

(2) As the plurality of kinds of probability distributions, probability distribution at occurrence of specific vehicle behavior and probability distribution at non-occurrence of the specific vehicle behavior are selected. Hence, since opposed probability distributions concerning common vehicle behavior are used, it is possible to predict vehicle behavior based on both the probability that specific vehicle behavior will occur and the probability that the specific vehicle behavior will not occur. According to this, it is possible to more accurately predict vehicle behavior of a prediction-subject vehicle.

(3) When a relative positional relationship of vehicle behavior of a prediction-subject vehicle belongs to the probability distribution at non-occurrence of specific vehicle behavior and does not belong to the probability distribution at occurrence of the specific vehicle behavior, the vehicle behavior prediction device predicts that the prediction-subject vehicle will not exhibit the corresponding vehicle behavior. According to this, it is possible to accurately predict that the prediction-subject vehicle will not exhibit the corresponding vehicle behavior based on the opposed probability distributions.

(4) When a relative positional relationship of vehicle behavior of a prediction-subject vehicle does not belong to the probability distribution at non-occurrence of specific vehicle behavior or belongs to both the probability distribution at non-occurrence of the specific vehicle behavior and the probability distribution at occurrence of the specific vehicle behavior, it is determined that it is indeterminable whether vehicle behavior of the prediction-subject vehicle will not be exhibited. According to this, under a situation in which it is doubtful that the prediction-subject vehicle will not exhibit specific vehicle behavior, it is determined that it is indeterminable whether the vehicle will not exhibit the specific vehicle behavior, and it is possible to provide information other than a prediction result whether the vehicle behavior will be exhibited or not.

(5) If a relative positional relationship of vehicle behavior of a prediction-subject vehicle belongs to the probability distribution at the occurrence of specific vehicle behavior and does not belong to the probability distribution at non-occurrence of the specific vehicle behavior, the vehicle behavior prediction device predicts that the prediction-subject vehicle will exhibit corresponding vehicle behavior. According to this, it is possible to accurately predict that the prediction-subject vehicle will exhibit the corresponding vehicle behavior based on the opposed probability distributions.

(6) When a relative positional relationship of vehicle behavior of a prediction-subject vehicle does not belong to the probability distribution at occurrence of specific vehicle behavior or belongs to both probability distribution at the occurrence of the specific vehicle behavior and the probability distribution at non-occurrence of the specific vehicle behavior, it is determined that it is indeterminable whether the prediction-subject vehicle will exhibit the corresponding vehicle behavior. According to this, under a situation where it is doubtful that the prediction-subject vehicle will exhibit a specific vehicle behavior, it is determined that it is indeterminable whether the vehicle will exhibit the specific vehicle behavior, and it is possible to provide information other than a prediction result whether the vehicle behavior will be exhibited or not.

(7) The vehicle behavior selects deceleration behavior of a vehicle. As the traveling state information, information representing traveling speed and acceleration of the vehicle 100 and a vehicle in front is collected, and a plurality of kinds of probability distributions is obtained for each of the collected traveling speed and acceleration of the vehicles. The vehicle behavior prediction device predicts that vehicle behavior will not be executed using the probability distribution based on traveling speed and predicts that vehicle behavior will be executed using the probability distribution based on acceleration. According to this, it is possible to accurately predict occurrence and non-occurrence of deceleration behavior that has high necessity of prediction.

(8) A predetermined zone from the center of probability distribution representing the average value of vehicle behavior is defined as a reliability zone concerning occurrence probability of the vehicle behavior. The vehicle behavior prediction device predicts vehicle behavior of a prediction-subject vehicle using the probability distribution in this reliability zone. According to this, it is possible to further enhance the reliability of a prediction result. Since a probability distribution in a previously defined reliability zone is used, when the vehicle behavior prediction device predicts vehicle behavior, it is only necessary to determine whether behavior of the prediction-subject vehicle belongs to probability distribution in the reliability zone. Hence, it is possible to more easily predict vehicle behavior.

(9) The traveling state information includes information concerning at least one of a traveling location of a vehicle and characteristics of the traveling location. The plurality of kinds of probability distributions is obtained for each of traveling locations or characteristics of the traveling locations. When the vehicle behavior prediction device predicts vehicle behavior, a traveling location of a prediction-subject vehicle or characteristics of the traveling location are determined, and a plurality of kinds of probability distributions obtained by the distribution calculating unit concerning a traveling location or characteristics of the traveling location that are common with this determination result is used for predicting vehicle behavior. According to this, it is possible to predict vehicle behavior using a probability distribution that is strongly linked to the corresponding traveling location, and the accuracy of prediction using probability distributions is further improved. By linking a traveling location and its characteristics to probability distributions in this manner, it is also possible to predict whether vehicle behavior has occurred due to the traveling location or its characteristics, or whether the vehicle behavior has occurred due to a traveling state of a vehicle that is different from the traveling location and its characteristics.

(10) When probability distribution in a traveling location of a prediction-subject vehicle does not exist in the distribution database 150, the vehicle behavior prediction device predicts vehicle behavior using probability distribution formed at a location having characteristics that are similar to the traveling location. According to this, even if probability distribution at a location matching with the traveling location of the prediction-subject vehicle does not exist, if probability distribution formed at a location having characteristics that are common with or similar to the former location only exists, it is possible to predict vehicle behavior using this probability distribution. Hence, aspects capable of predicting vehicle behavior are exponentially increased, and it is possible to predict vehicle behavior in a greater number of situations.

Second Embodiment

Next, a vehicle behavior prediction device, a vehicle behavior prediction method and a driving assistance device according to a second embodiment of the present invention will be described with reference to FIGS. 9 and 10 to 13, which correspond to FIG. 6, and portions of the second embodiment that are different from the first embodiment will mainly be described. Basic configurations of the vehicle behavior prediction device, the vehicle behavior prediction method and the driving assistance device of the second embodiment are similar to those of the first embodiment, and in FIGS. 9 to 13 also, the same reference signs are allocated to substantially the same elements as those of the first embodiment, and redundant description will be omitted.

Figure 9:
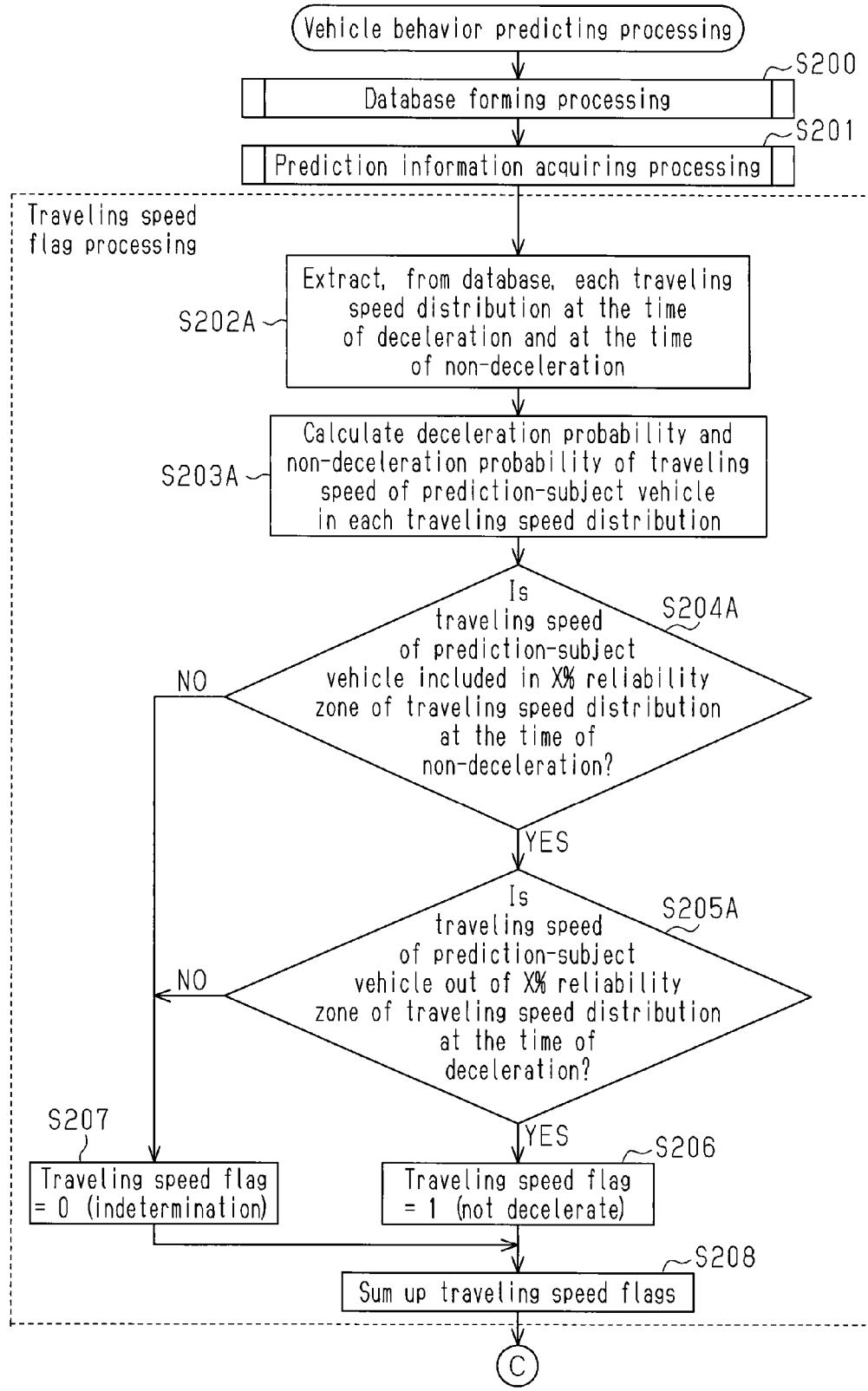
FIG. 9 is a is a flowchart representing one example of vehicle behavior predicting processing concerning a vehicle behavior prediction device, a vehicle behavior prediction method and a driving assistance device of a second embodiment according to the invention.
Figures 1, 9:
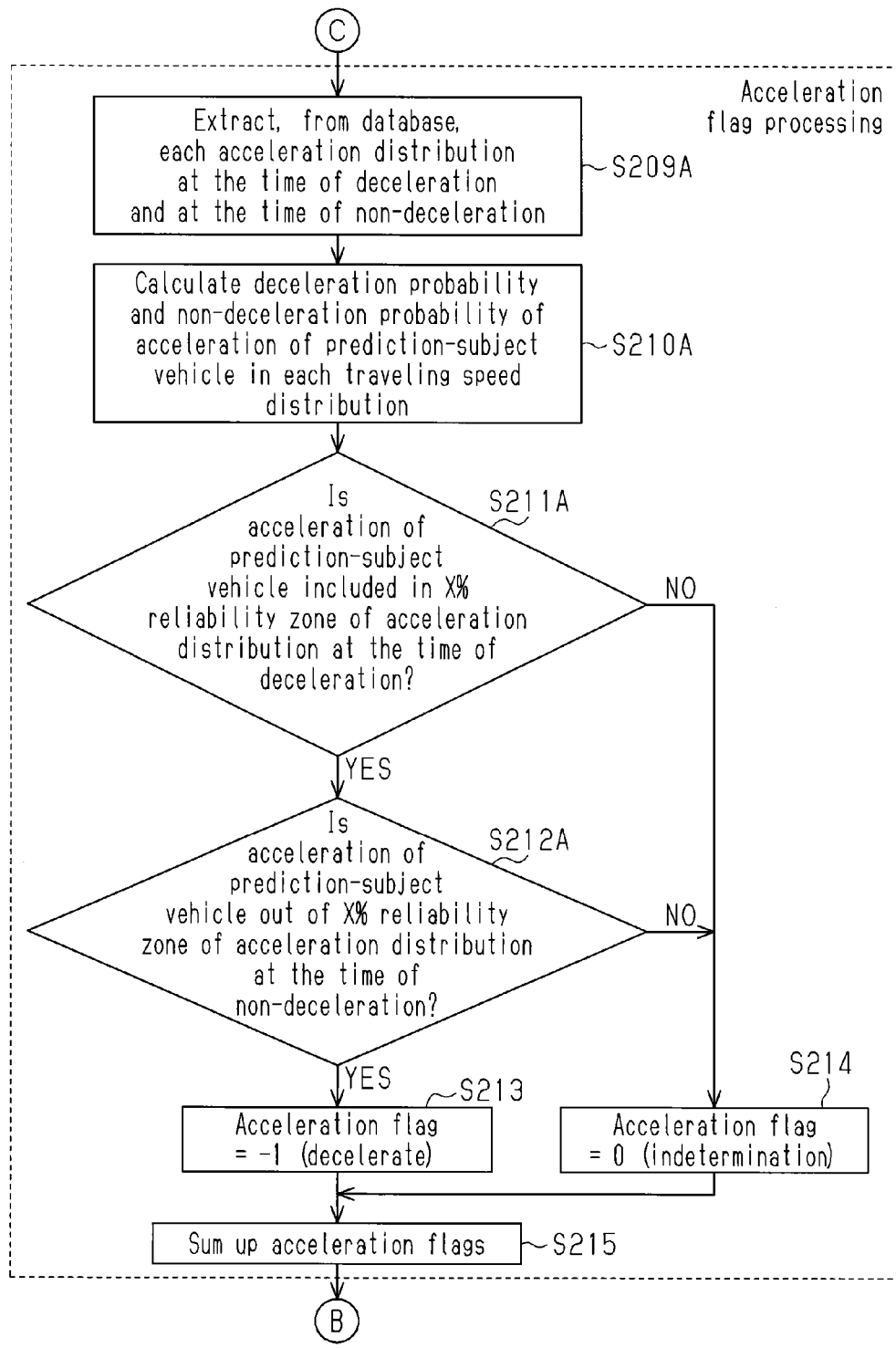

As shown in FIG. 9, assume that database forming processing and prediction information acquiring processing are executed when the vehicle behavior prediction device predicts vehicle behavior (steps S200, S201).

In this embodiment, probability distribution of traveling speed in an intersection toward which a vehicle in front travels or an intersection that is similar to the former intersection in shape or road shape, i.e., the probability distribution shown in FIG. 2(a) is extracted from a distribution database 150 (step S202A).

Next, if traveling speed of the vehicle in front in the intersection is acquired through the prediction information acquiring processing for example, a relative positional relationship of the traveling speed of the vehicle in front with respect to each of probability distributions at the time of deceleration and at the time of non-deceleration of the traveling speed is obtained (step S203A).

As shown in FIG. 10, the traveling speed of the vehicle in front at a location of about 40 m short of the intersection is speed Vs1, which is different from an average value of the traveling speed at the time of non-deceleration by a predetermined speed or more, and the occurrence probability of non-deceleration behavior caused by the vehicle in front is about 3%. This traveling speed Vs1 of the vehicle in front is not included in a 95% reliability zone of the probability distribution at the time of non-deceleration as shown in FIG. 10 for example, and the traveling speed Vs1 belongs only to the non-reliability zone. Hence, when the traveling speed Vs1 of the vehicle in front is not included in the reliability zone of the probability distribution at the time of non-deceleration (step S204A in FIG. 9: NO), it is determined that deceleration behavior in the vehicle in front is indeterminable, and a traveling speed flag is set to 0 (step S207).

On the other hand, when traveling speed of the vehicle in front at a location of about 40 m short of the intersection is speed Vs2, which is close to the average value of the traveling speed at the time of non-deceleration as shown in FIG. 11 for example, occurrence probability of non-deceleration behavior caused by the vehicle in front is about 60%. As shown in FIG. 11, the traveling speed Vs2 of the vehicle in front is included in the 95% reliability zone of the probability distribution at the time of non-deceleration for example (step S204A in FIG. 9: YES). As shown in FIG. 12, the traveling speed Vs2 of the vehicle in front is different from the average value of probability distribution at the time of deceleration by predetermined speed or more, and the traveling speed Vs2 is out of the 95% reliability zone of the probability distribution at the time of deceleration for example (step S205A in FIG. 9: YES). When the traveling speed Vs2 of the vehicle in front is included only in the reliability zone at the time of non-deceleration, it is determined that deceleration behavior is not occurring in the vehicle in front, and a traveling speed flag is set to 1 (step S206). The more the traveling speed of the vehicle in front approaches the average value of the probability distribution at the time of non-deceleration and the higher the occurrence probability of the non-deceleration behavior becomes, the higher the reliability of a prediction result that deceleration behavior is not occurring in the vehicle in front becomes. Similarly, the more the traveling speed of the vehicle in front approaches the average value of the probability distribution at the time of deceleration and the higher the occurrence probability of deceleration behavior becomes, the higher the reliability of a prediction result that deceleration behavior occurs in the vehicle in front becomes.

Figure 13:
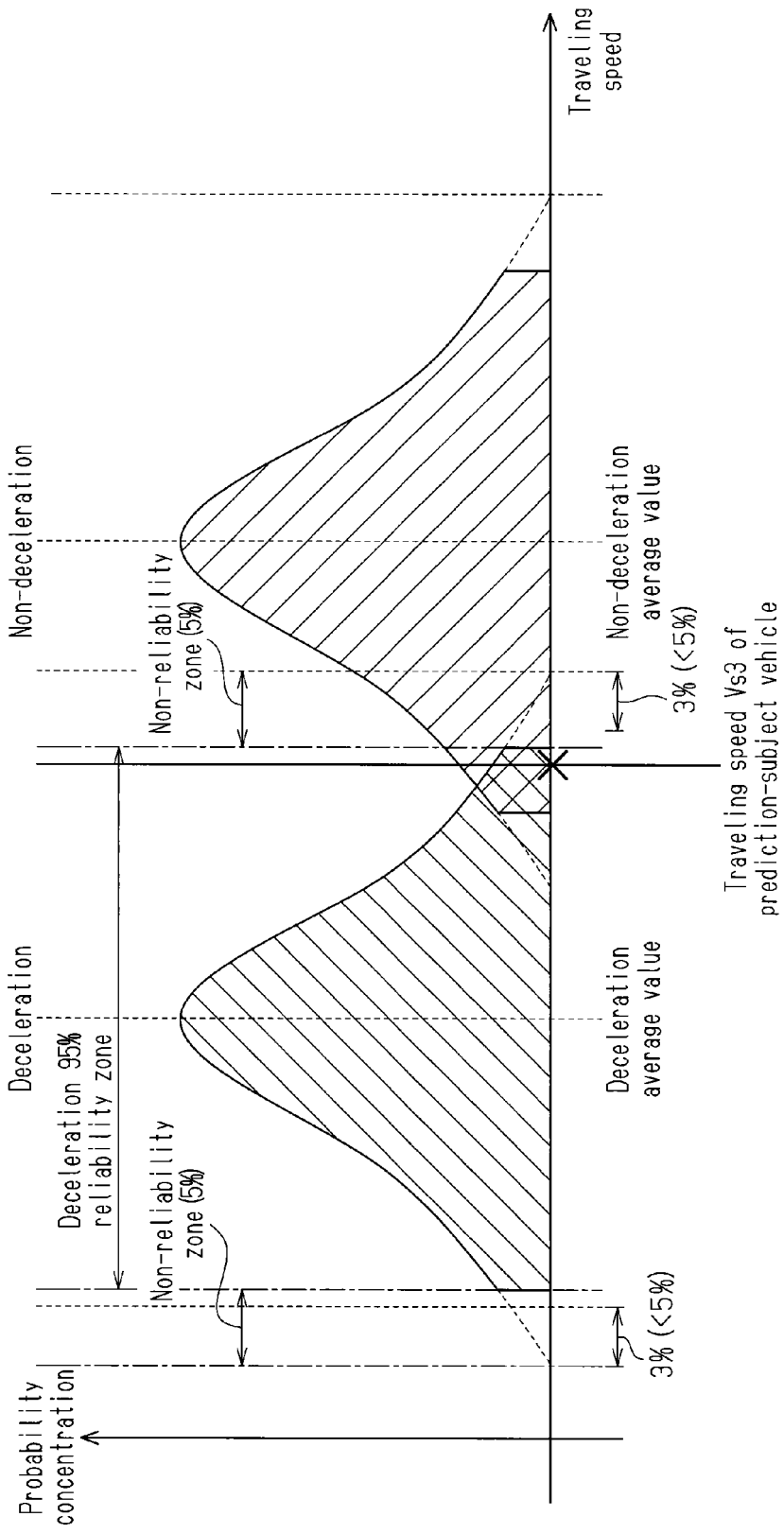
FIG. 13 is a graph showing one example of a probability distribution concerning traveling speed in a location that is separated away from an intersection by a predetermined distance at the time of deceleration and at the time of non-deceleration together with a reliability zone.

As shown in FIG. 13, when the traveling speed of the vehicle in front at a location of about 40 m short of the intersection is speed Vs3, which is different from an average value at the time of non-deceleration and an average value at the time of deceleration by a predetermined speed or more for example, and the traveling speed of the vehicle in front is included in both the 95% reliability zones of the probability distributions at the time of non-deceleration and at the time of deceleration, for example (step S204A in FIG. 9: YES, S205A: NO). At this time, it is determined that both the probability that deceleration behavior will occur in the vehicle in front and the probability that deceleration behavior will not occur in the vehicle in front are high, and the traveling speed flag is set to 0 (step S207).

As represented as step S206 in FIG. 9, if counts of the traveling speed flag are summed up, probability distribution of acceleration in the intersection toward which the vehicle in front travels or an intersection that is similar to the former intersection in shape or road shape, i.e., the probability distribution shown in FIG. 2(b) is extracted from the distribution database 150 (step S209A).

In modes shown in FIGS. 9 to 13, deceleration probability and non-deceleration probability are obtained based on acceleration of the vehicle in front and probability distributions at the time of non-deceleration and at the time of deceleration concerning acceleration in the intersection toward which the vehicle in front travels for example (step S210A).

Next, when acceleration of the vehicle in front is included in the 95% reliability zone of acceleration distribution at the time of deceleration (step S211A: YES) and is out of the 95% reliability zone at the time of non-deceleration (step S212A: YES), it is determined that deceleration behavior will occur in the vehicle in front at the intersection toward which the vehicle in front travels, and an acceleration flag is set to "−1".

When acceleration of the vehicle in front is not included in the 95% reliability zone of the acceleration distribution at the time of deceleration for example (step S211A: NO), it is determined that occurrence of deceleration behavior in the vehicle in front is indeterminable, and the traveling speed flag is set to "0" (step S214). Similarly, also when acceleration of the vehicle in front is included in both probability distributions at the time of non-deceleration and at the time of deceleration (step S212A: NO), it is determined that occurrence of deceleration behavior in the vehicle in front is indeterminable, and the deceleration flag is set to "0" (step S214).

If the acceleration flag is determined in this manner, results of the determined acceleration flag are summed up (step S215).

Thereafter, by executing steps S216 to S221 shown in FIG. 8, it is determined that deceleration behavior occurs, that deceleration behavior is not occurring, and that presence or absence of occurrence of deceleration behavior is indeterminable in the vehicle in front.

As described above, according to the vehicle behavior prediction device, the vehicle behavior prediction method and the driving assistance device of the second embodiment, the above-described advantages (1) to (7), (9) and (10) are obtained, the following advantage (8A) is obtained instead of the advantage (8), and the following advantage (11) is also obtained.

(8A) A predetermined zone from the center of the probability distribution representing an average value of vehicle behavior is defined as a reliability zone concerning occurrence probability of the vehicle behavior. It is determined whether vehicle behavior of a prediction-subject vehicle belongs to the probability distribution based on whether the vehicle behavior belongs to a reliability zone of the probability distribution. According to this, probability that a prediction result and behavior of the prediction-subject vehicle match with each other is preferably improved, and reliability of the prediction result is preferably improved. According to this, it is possible to realize reliable prediction only by defining the reliability zone in this probability distribution in an ex post manner without especially processing the obtained probability distribution.

(11) A relative positional relationship in probability distribution of vehicle behavior of a prediction-subject vehicle is obtained as occurrence probability and non-occurrence probability of the vehicle behavior. Hence, it is possible not only to predict occurrence of vehicle behavior but also to determine reliability of a prediction result of the vehicle behavior based on occurrence probability of the vehicle behavior. According to this, when occurrence probability and non-occurrence probability of the vehicle behavior is about 60% for example, it is possible to estimate that probability that the prediction result and vehicle behavior of the prediction-subject vehicle match with each other is high. When occurrence probability belongs to the reliability zone but occurrence probability and non-occurrence probability of the vehicle behavior is less than about 30% for example, it is possible to estimate that probability that the prediction result and vehicle behavior of the prediction-subject vehicle match with each other is low. By obtaining occurrence probability and non-occurrence probability of the vehicle behavior in this manner, it is possible to weight the prediction result.

Third Embodiment

Next, a vehicle behavior prediction device, a vehicle behavior prediction method and a driving assistance device according to a third embodiment of the present invention will be described with reference to FIG. 14, which corresponds to FIG. 1, and portions of the third embodiment that are different from the first embodiment will mainly be described. Basic configurations of the vehicle behavior prediction device, the vehicle behavior prediction method and the driving assistance device of the third embodiment are also similar to those of the first embodiment, and in FIG. 14 also, the same reference signs are allocated to substantially the same elements as those of the first embodiment, and redundant description will be omitted.

Figure 14:
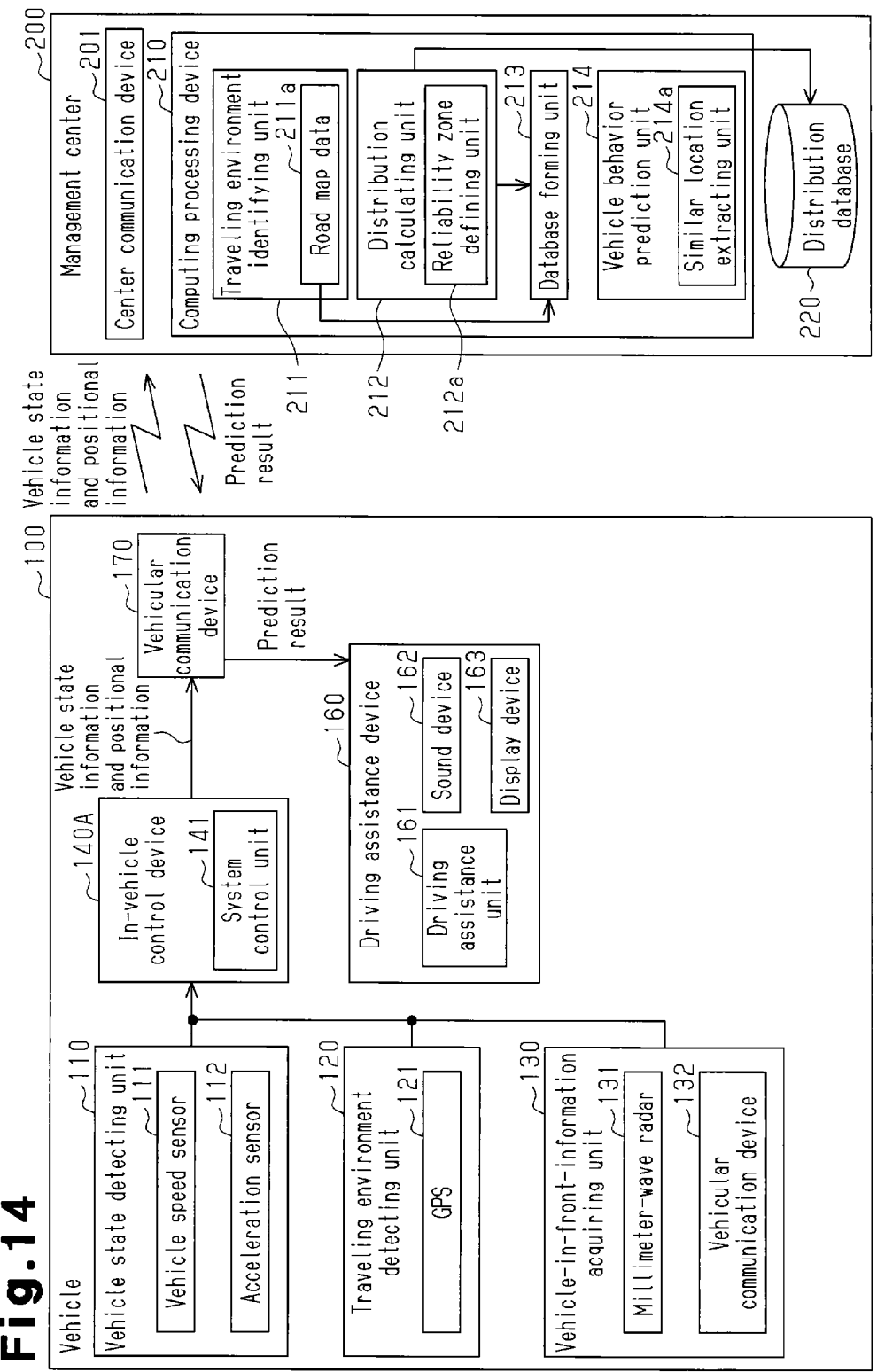
FIG. 14 is a schematic block diagram of a management center and a vehicle to which a vehicle behavior prediction device, a vehicle behavior prediction method and a driving assistance device of a third embodiment according to the invention are applied.

As shown in FIG. 14, the traveling environment identifying unit 142, the distribution calculating unit 143, the database forming unit 144, the vehicle behavior prediction unit 145 and the distribution database 150 are omitted from an in-vehicle control device 140A provided in a vehicle 100 of this embodiment. The vehicle 100 of this embodiment is provided with a vehicular communication device 170 having a communication function with a center communication device 201 provided in a management center 200 of a probe information communication system.

The management center 200 is provided with a computing processing device 210, which executes various kinds of calculation processing. The computing processing device 210 of this embodiment is provided with a traveling environment identifying unit 211, a distribution calculating unit 212, a database forming unit 213 and a vehicle behavior prediction unit 214, which respectively correspond to the traveling environment identifying unit 142, the distribution calculating unit 143, the database forming unit 144 and the vehicle behavior prediction unit 145. Among them, the traveling environment identifying unit 211 includes road map data 211a, which corresponds to the road map data 142a. The distribution calculating unit 212 includes a reliability zone defining unit 212a, which corresponds to the reliability zone defining unit 143a. The vehicle behavior prediction unit 214 includes a similar location extracting unit 214a, which corresponds to the similar location extracting unit 145a. The management center 200 includes a distribution database 220, which corresponds to the distribution database 150.

Next, operation of the vehicle behavior prediction device, the vehicle behavior prediction method and the driving assistance device of this embodiment will be described.

First, the management center 200 acquires, through communication with a plurality of vehicles including the vehicle 100, vehicle state information representing vehicle states of the vehicles such as traveling speed and acceleration and positional information representing the latitude and longitude at traveling locations.

The computing processing device 210 identifies traveling environments of the respective vehicles based on the vehicle state information and the positional information summed up in the management center 200, and appropriately forms probability distributions of vehicle behavior at an identified location. The computing processing device 210 appropriately registers the formed probability distribution in the distribution database 220.

The computing processing device 210 receives, from the vehicle 100, a prediction request of vehicle behavior of a vehicle in front, which travels in front of the vehicle 100 in the traveling direction. When the computing processing device 210 acquires vehicle state information and positional information of the vehicle in front sent from the vehicle 100 through communication with the vehicle 100 or the vehicle in front, the computing processing device 210 predicts vehicle behavior of the vehicle in front based on the acquired information. Next, the management center 200 sends a prediction result to the vehicle 100.

In the vehicle 100, if the vehicular communication device 170 receives the prediction result, this prediction result is input to a driving assistance unit 160. The driving assistance unit 160 carries out various kinds of driving assistances based on this prediction result.

As described above, according to the vehicle behavior prediction device, the vehicle behavior prediction method and the driving assistance device of this embodiment, the above-described advantages (1) to (10) are obtained, and the following advantage is also obtained.

(12) Information sets that are necessary for predicting vehicle behavior are collected in the management center 200, and the management center 200 forms probability distribution and predicts vehicle behavior. Hence, it is possible to easily collect information sets that are necessary for predicting vehicle behavior from a plurality of vehicles, and it is possible to form probability distributions and to predict vehicle behavior in a wide area. According to this, it is possible to predict vehicle behavior using an abundance of probability distributions, and aspects capable of predicting vehicle behavior are increased. According to this configuration, it is possible to form probability distribution and to predict vehicle behavior exclusively by the management center 200, and it becomes easy to provide the management center 200 with a sophisticated computing processing device and a high-capacity database. According to this, it is possible to form probability distribution and predict vehicle behavior fast and accurately, and a large amount of formed probability distributions can be registered in the distribution database 220.

Other Embodiments

The above-described embodiments may also be carried out in the following modes.

In the third embodiment, the vehicle 100 is provided with the vehicle-in-front-information acquiring unit 130. The present invention is not limited to this, and a vehicle in front, which travels in front of the prediction-subject vehicle 100 in the traveling direction, may be identified based on the latitude and longitude information of the vehicle 100 for example. The management center 200 may acquire information representing traveling speed and acceleration of the vehicle in front, which is necessary for predicting vehicle behavior through communication between this identified vehicle in front and the management center 200. According to this, since the vehicle 100 does not need to detect traveling speed and acceleration of the vehicle in front, it is possible to omit the vehicle-in-front-information acquiring unit 130, which is provided in the vehicle 100.

In each of the embodiments, the latitude and longitude of a vehicle in front are acquired based on detection results of the GPS 121 and the millimeter-wave radar 131 provided in the vehicle 100, which follows the vehicle in front. The invention is not limited to this, and the latitude and longitude information of the vehicle in front may be acquired through vehicle-to-vehicle communication between the vehicle 100 and the vehicle in front.

In each of the embodiments, the vehicle-in-front-information acquiring unit 130 is composed of the millimeter-wave radar 131 and the vehicular communication device 132. The invention is not limited to this, and the vehicle-in-front-information acquiring unit 130 may be composed of only one of the millimeter-wave radar 131 and the vehicular communication device 132. The vehicle-in-front-information acquiring unit 130 may be composed of a vehicular camera, which shoots surrounding environment of the vehicle 100. In short, the vehicle-in-front-information acquiring unit 130 may be means capable of acquiring elements representing variation in vehicle behavior such as traveling speed and acceleration.

In each of the first and third embodiments, when the vehicle behavior prediction device predicts vehicle behavior, traveling speed and acceleration of a vehicle in front from a location of about 40 m short to a location of about 20 m short of an intersection where a difference between probability distribution at the time of deceleration and probability distribution at the time of non-deceleration appears notably are used. As shown in FIGS. 3 and 4, the vehicle behavior prediction device predicts vehicle behavior of a vehicle in front based on whether transition of the traveling speed and the acceleration of the vehicle in front is included in the probability distribution of this traveling zone. The invention is not limited to this, and it may be determined that the traveling speed or the acceleration of the vehicle in front is included in probability distribution at the time of deceleration or at the time of non-deceleration based on whether about 60% or more of transition of the traveling speed or the acceleration of the vehicle in front belongs to the probability distribution at the time of deceleration or at the time of non-deceleration shown in FIGS. 3 and 4. Like the second embodiment, the vehicle behavior prediction device may predict vehicle behavior using traveling speed and deceleration at one location that is separated away from an intersection toward a subject vehicle by a predetermined distance and using probability distributions thereof.

In the second embodiment, the vehicle behavior prediction device predicts behavior of a vehicle in front based on probability distribution, traveling speed and acceleration of the vehicle in front at a location of about 40 m short of an intersection as one example. The invention is not limited to this and traveling speed, acceleration and probability distribution of a prediction-subject vehicle used for predicting vehicle behavior may be obtained at a location where a difference between probability distribution at the time of deceleration and probability distribution at the time of non-deceleration is generated. That is, this location where the traveling speed, the acceleration and the probability distribution are obtained is not limited to the location of about 40 m short of an intersection, and even if the distance between the location and the intersection is shorter than about 40 m or longer than about 40 m, it is possible to use the traveling speed, the acceleration and the probability distribution for predicting vehicle behavior. Like the first and third embodiments, it is possible to predict vehicle behavior based on transition of traveling speed and acceleration in front of a predetermined traveling zone short of an intersection and based on probability distribution of the traveling speed and the acceleration in the traveling zone.

In each of the embodiments, probability distributions concerning traveling speed and acceleration are formed based on traveling speed and acceleration of the vehicle 100 and a vehicle in front of the vehicle 100. The invention is not limited to this, and the probability distributions may be formed based on traveling speed and acceleration of only the vehicle 100 or the vehicle in front.

In each of the embodiments, probability distribution of traveling speed is used to predict that a prediction-subject vehicle will not decelerate, and probability distribution of acceleration is used to predict that the prediction-subject vehicle will decelerate. Conversely, probability distribution of acceleration may be used to predict that a prediction-subject vehicle will not decelerate, and probability distribution of traveling speed may be used to predict that the prediction-subject vehicle will decelerate. As shown in FIGS. 3 and 4, at a location far from a deceleration location such as an intersection, the difference between probability distributions of acceleration at the time of deceleration and at the time of non-deceleration appears more notably than the difference between probability distributions of traveling speed at the time of deceleration and at the time of non-deceleration. As approaching the deceleration location such as the intersection, the difference between probability distributions of traveling speed at the time of deceleration and at the time of non-deceleration appears more notably than the difference between probability distributions of acceleration at the time of deceleration and at the time of non-deceleration. Hence, in keeping with such characteristics, for predicting vehicle behavior at a location separated away from the deceleration location such as the intersection by a predetermined distance or more, it is also possible to predict presence or absence of occurrence of deceleration behavior using acceleration of a prediction-subject vehicle and probability distribution concerning the acceleration at the same location. Further, for predicting vehicle behavior at a location close to the deceleration location such as the intersection within a predetermined distance, it is also possible to predict presence or absence of occurrence of deceleration behavior using traveling speed of the prediction-subject vehicle and probability distribution concerning the traveling speed at the same location. According to this, it is possible to predict vehicle behavior using probability distributions of traveling speed and acceleration in accordance with characteristics of probability distributions of traveling speed and acceleration that vary in a predetermined zone short of a deceleration location. According to this, prediction accuracy of vehicle behavior can be improved.

In each of the embodiments, probability distributions of traveling speed and acceleration are formed in accordance with deceleration behavior at an intersection to predict vehicle behavior of a prediction-subject vehicle at the intersection. The invention is not limited to this, it is also possible to form probability distribution at a traveling location where specific vehicle behavior occurs due to occurrence of specific driving operation such as a temporary stop position, a railroad crossing, a tollbooth provided on expressway, a junction of a plurality of roads and a curve, and it is possible to predict vehicle behavior at the traveling location based on the formed probability distribution.

In each of the embodiments, 95% of probability distribution is defined as the reliability zone. The invention is not limited to this, and the reliability zone may be 96% or more or 94% or less. It is also possible to set the reliability zone to 100%.

Figure 15:
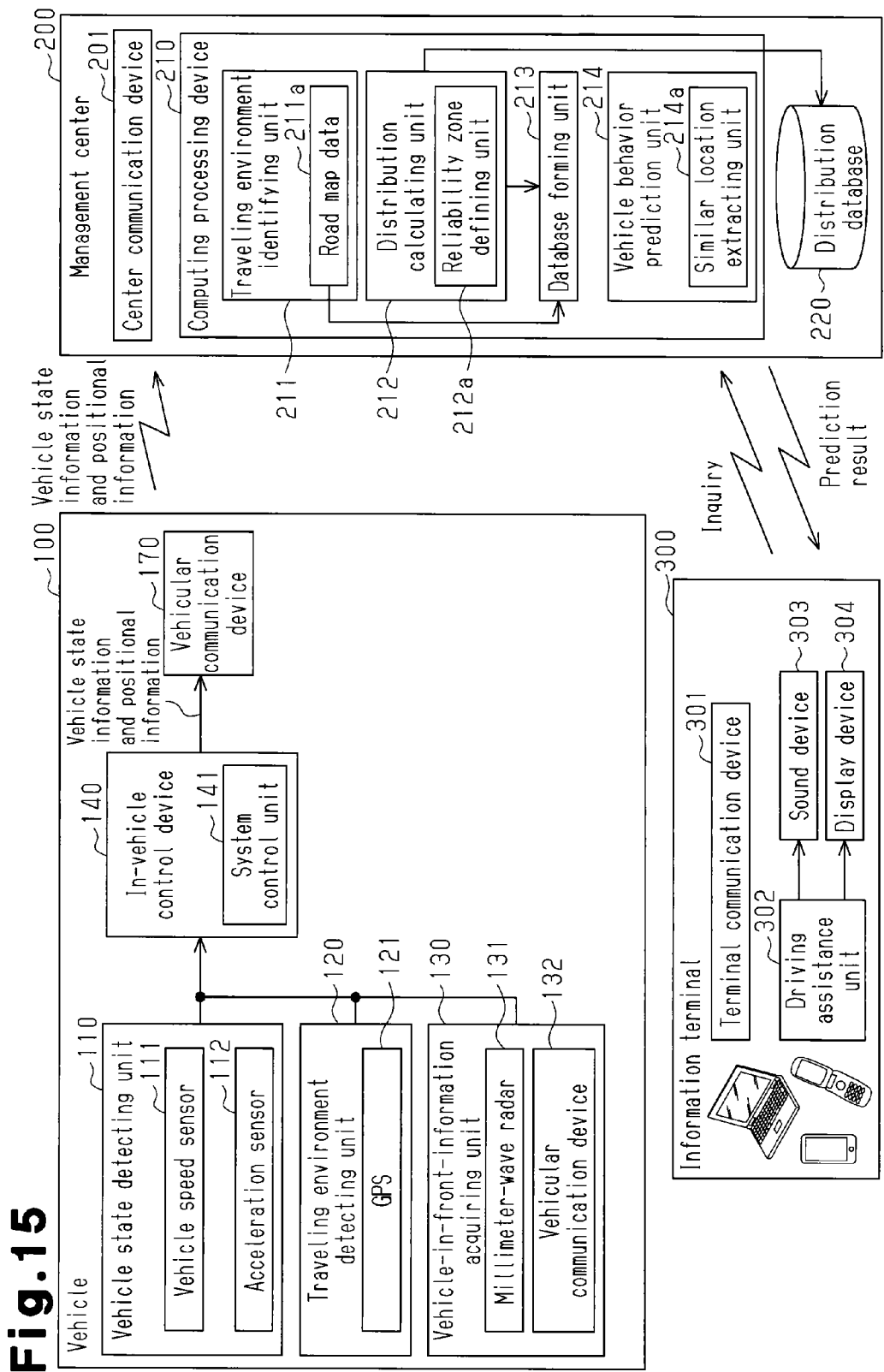
FIG. 15 is a schematic block diagram of a management center, an information terminal and a vehicle to which a vehicle behavior prediction device, a vehicle behavior prediction method and a driving assistance device of another embodiment according to the invention are applied.

In the third embodiment, probability distribution formed by the management center 200 and a prediction result of predicted vehicle behavior are sent to the requesting vehicle 100. The invention is not limited to this, and as shown in FIG. 15 corresponding to FIG. 14 for example, a driving model formed by the management center 200 or an evaluation result of driving technique may be sent to a portable information terminal such as a smartphone or an information terminal 300 including a personal computer. According to this configuration, if the user of the information terminal 300, who is in the vehicle 100 for example, requests prediction of vehicle behavior through the information terminal 300, request information is sent from a terminal communication device 301 to the management center 200. As a response to this request information, a prediction result of a vehicle in front, which travels in front of the vehicle 100 in the traveling direction, is sent to the information terminal 300. In the information terminal 300, the user of the information terminal 300 is informed of the prediction result in a form of audio assistance or image assistance by an sound device 303 or a display device 304 provided in the information terminal 300 through predetermined calculation carried out by a driving assistance unit 302 having a function based on the driving assistance unit 161. In this case, the driving assistance unit 160 of the vehicle 100 may be omitted as shown in FIG. 15.

Figure 16:
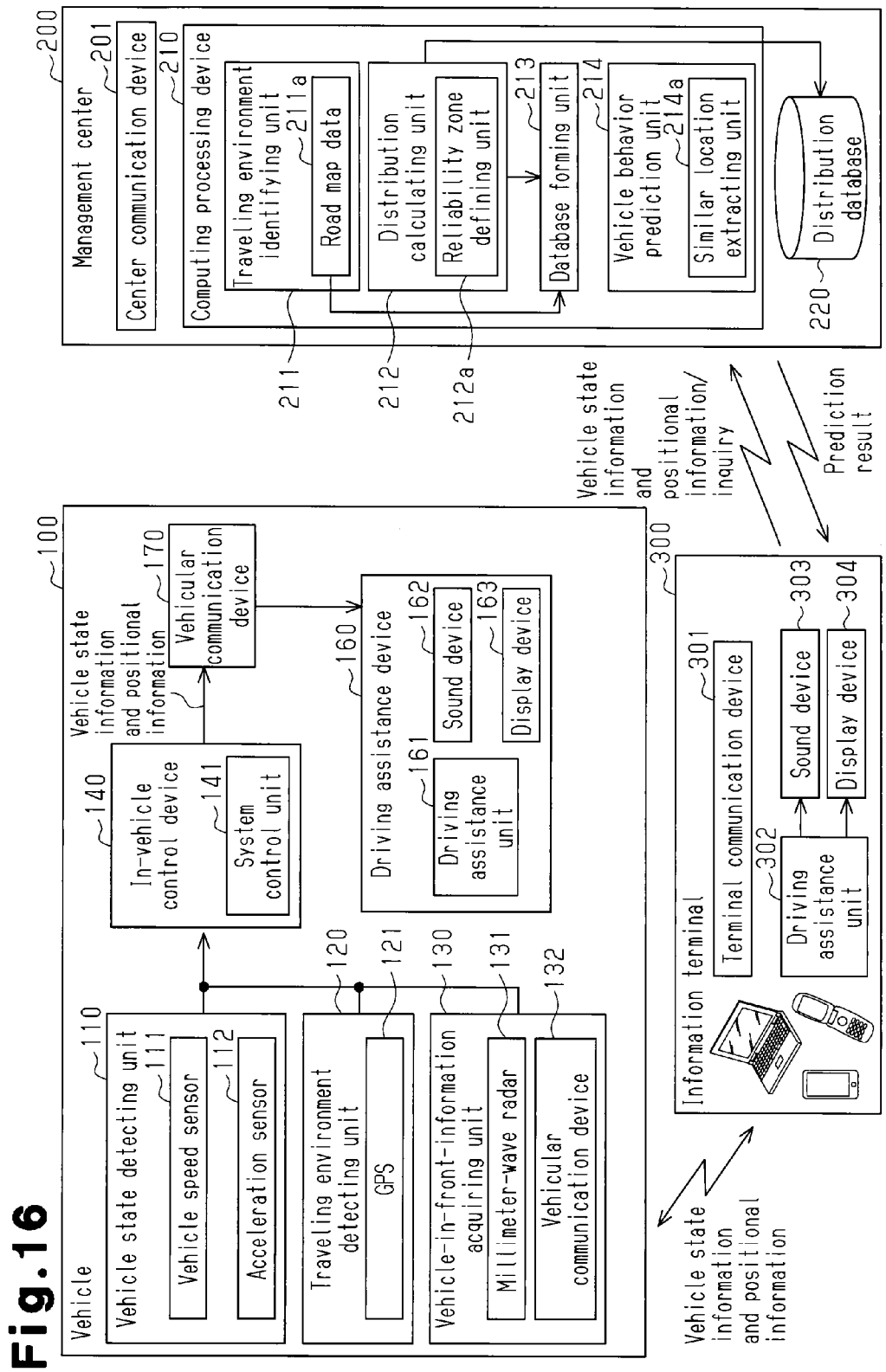
FIG. 16 is a schematic block diagram of a management center, an information terminal and a vehicle to which a vehicle behavior prediction device, a vehicle behavior prediction method and a driving assistance device of another embodiment according to the invention are applied.

As shown in FIG. 16 corresponding to FIG. 15, vehicle state information and positional information of the vehicle 100 or the vehicle in front collected by the vehicle 100 may be once held in the information terminal 300 through wire communication or wireless communication between the terminal communication device 301 and the vehicular communication device 170 of the vehicle 100. The information held in the information terminal 300 may be sent from the information terminal 300 to the management center 200 through wireless communication between the terminal communication device 301 of the information terminal 300 and the center communication device 201 of the management center 200. The information terminal 300 may be utilized as a repeater of a prediction result, and the prediction result sent from the management center 200 to the information terminal 300 may be sent to the vehicle 100 and this prediction result may be utilized by the vehicle 100. According to this, it is possible to collect, in the management center 200, information that is necessary for predicting vehicle behavior utilizing the information terminal 300, which already has a communication function, and it is possible to enlarge a collecting source of information that is necessary for forming a driving model. When the information terminal 300 is provided with a GPS, a traveling position, traveling speed and acceleration of the vehicle 100 may be acquired based on a detection result of the GPS. Similarly, when the information terminal 300 is provided with a traveling speed sensor and an acceleration sensor, the traveling position, the traveling speed and the acceleration of the vehicle 100 may be acquired based on detection results of these sensors. Information representing the traveling position, the traveling speed and the acceleration of the vehicle 100 acquired by the information terminal 300 may be used for calculation of probability distribution as the traveling state information. According to this, it is possible to acquire traveling state information by the information terminal 300 alone, and to send the traveling state information acquired by the information terminal 300 from the information terminal 300 directly to the management center 200. Further, the information terminal 300 may be provided with the distribution calculating unit 143, the vehicle behavior prediction unit 145 and the distribution database 150. According to this, even if the traveling state information is not acquired from the vehicle 100, the information terminal 300 alone can acquire the traveling state information, form probability distribution, and predict vehicle behavior.

In each of the embodiments, when vehicle behavior has occurred based on a specific driving operation, probability distribution is formed for each of traveling locations or characteristics of the traveling locations. The invention is not limited to this. It is also possible to previously define a traveling location that requires prediction of vehicle behavior or characteristics of the traveling location and to form only a probability distribution in the defined traveling location or in characteristics of the traveling location. According to this, an infinite number of probability distributions is not formed, and only a probability distribution that has high possibility to be used for predicting vehicle behavior is formed. According to this, capacity of the distribution database 150 or 220 is reduced and calculation load of forming the probability distribution is reduced.

In each of the embodiments, a probability distribution is formed for each of the latitudes and longitudes of traveling locations or for each of characteristics of the traveling locations. When the vehicle behavior prediction device predicts vehicle behavior, the latitude and longitude of a traveling location to be predicted or characteristics of the traveling location are identified, and the vehicle behavior prediction device predicts vehicle behavior using s probability distribution that is common with the identified latitude and longitude or identified characteristics of the traveling location. The invention is not limited to this. The traveling environment identifying unit 142 and the traveling environment identifying unit 211 having the road map data 142a and 211a may be omitted, and a probability distribution may be formed for each of the latitudes and longitudes of traveling locations. It is also possible to predict vehicle behavior based on the latitude and longitude of a prediction-subject vehicle and probability distribution in that latitude and longitude. Conversely, a probability distribution may be formed for each of characteristics of traveling locations. It is also possible to predict vehicle behavior based on a probability distribution at a location having characteristics that are common with those of a traveling location of the prediction-subject vehicle. It is also possible to determine that the traveling state information does not include information representing a traveling location of the vehicle and characteristics of the traveling location, and appropriately formed probability distributions may be registered in the distribution database 150 or 220 without classifying the probability distributions based on the traveling location or characteristics of the traveling location. In this case, when the vehicle behavior prediction device predicts vehicle behavior, probability distribution formed based on traveling speed and acceleration that are common with or similar to those of the prediction-subject vehicle is extracted from the distribution database 150 or 220.

Figure 17:
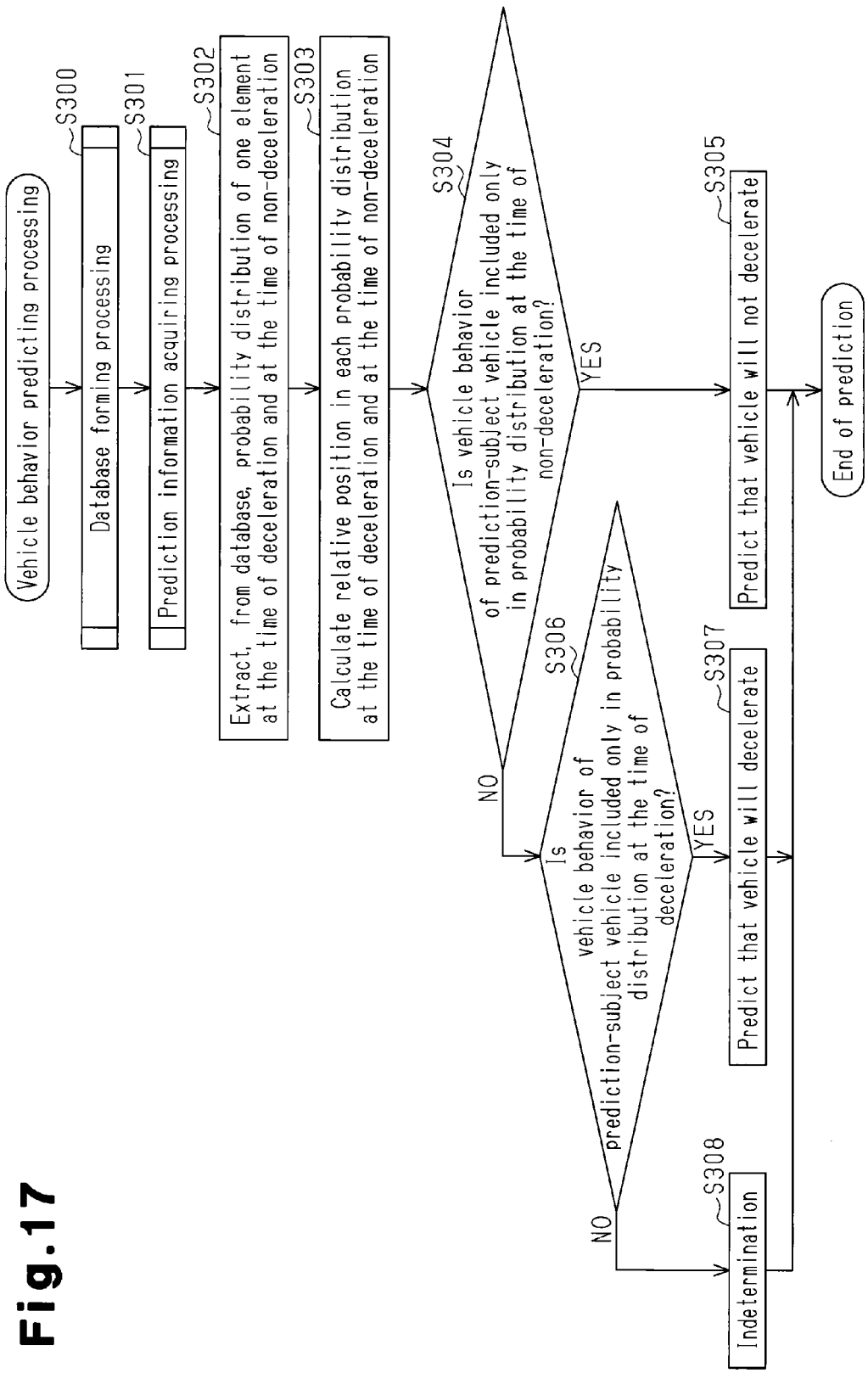
FIG. 17 is a is a flowchart representing one example of vehicle behavior predicting processing based on an element that represents one kind of vehicle behavior concerning a vehicle behavior prediction device, a vehicle behavior prediction method and a driving assistance device of another embodiment according to the invention.

In each of the embodiments, the vehicle behavior prediction device predicts vehicle behavior based on probability distributions of two elements, i.e., variation in traveling speed and variation in acceleration. The invention is not limited to this. It is also possible to predict vehicle behavior based on probability distribution of one of the elements, i.e., one of the traveling speed and acceleration. That is, as shown in FIG. 17 corresponding to FIGS. 7 and 8, probability distribution at the time of deceleration and at the time of non-deceleration of the traveling speed is formed for example (step S300). Next, if information representing traveling speed of a prediction-subject vehicle in front and a traveling location of this vehicle is acquired (step S301), probability distributions at the time of deceleration and at the time of non-deceleration concerning traveling speed at a traveling location of the vehicle in front or a location having characteristics that are common with those of this traveling location is extracted from the distribution database 150 or 220 (step S302). A relative positional relationship of traveling speed of the vehicle in front with respect to each of the extracted probability distributions is obtained (step S303). As a result, when the traveling speed of the vehicle in front is included only in the reliability zone of the probability distribution at the time of non-deceleration (step S304: YES), the vehicle behavior prediction device predicts that deceleration behavior will not occur in the vehicle in front (step S305). When the traveling speed of the vehicle in front is included only in the reliability zone of the probability distribution at the time of deceleration (step S304: NO, S306: YES), the vehicle behavior prediction device predicts that deceleration behavior will not occur in the vehicle in front (step S307). On the other hand, when the traveling speed of the vehicle in front is included in both the reliability zones of probability distributions at the time of deceleration and at the time of non-deceleration or is not included in any of these reliability zones of the probability distributions (step S306: NO), it is determined that that vehicle behavior of the vehicle in front is indeterminable (step S308). Also when an element used for predicting vehicle behavior is acceleration, steps S301 to S308 are executed, thereby predicting vehicle behavior based on the acceleration. According to this, it is only necessity to form probability distribution concerning traveling speed or acceleration and to acquire traveling speed or acceleration of the prediction-subject vehicle. Hence, it is possible to predict a prediction-subject vehicle by means of easier processing.

In the third embodiment, the management center 200 is provided with the distribution calculating unit 212, the vehicle behavior prediction unit 214 and the distribution database 220. The invention is not limited to this, the management center 200 may be provided with the distribution calculating unit 212 and the distribution database 220, and the vehicle 100 may be provided with the vehicle behavior prediction unit 145. According to this configuration, when the vehicle behavior prediction unit 145 predicts vehicle behavior, the vehicle behavior prediction unit 145 acquires probability distribution that is necessary for predicting vehicle behavior from the management center 200. The vehicle behavior prediction unit 145 predicts vehicle behavior of a prediction-subject vehicle using this acquired probability distribution. According to this configuration also, it is only necessary that the vehicle 100 predicts behavior of the prediction-subject vehicle, a calculation load required for predicting the vehicle behavior is reduced, and a processing load of the in-vehicle control device 140 is reduced. In each of the embodiments, the vehicle 100 may hold only probability distribution at a traveling location where the vehicle 100 frequently travels or a location having characteristics that are similar to those of the former traveling location. According to this, it is only necessary that the vehicle 100 holds only probability distribution having high using frequency, and a storage region for registering probability distributions can be reduced.

In each of the embodiments, the vehicle behavior prediction device predicts presence or absence of occurrence of deceleration behavior at a deceleration location. The invention is not limited to this, it is also possible to form the probability distribution based on a vehicle traveling state acquired at the time of right turning, left turning, straight traveling at an intersection or based on a vehicle traveling state at the time of start, and to predict right turning, left turning, straight traveling and start of a prediction-subject vehicle based on the formed probability distribution. Further, it is possible to predict other vehicle behavior that occurs in accordance with a traffic element existing on a road using the probability distribution.

In each of the embodiments, the vehicle behavior prediction device predicts vehicle behavior using probability distribution at occurrence of specific vehicle behavior and probability distribution at non-occurrence of the specific vehicle behavior. The invention is not limited to this, the vehicle behavior prediction device may predict vehicle behavior using a plurality of kinds of probability distributions, and to predict vehicle behavior based on probability distribution of traveling speed at the time of deceleration and probability distribution of acceleration at the time of deceleration. Similarly, it is also possible to predict vehicle behavior based on probability distribution of traveling speed at the time of non-deceleration and probability distribution of non-acceleration at the time of deceleration. According to this, when traveling speed and acceleration of the prediction-subject vehicle are included in each of the probability distributions concerning traveling speed and acceleration at the time of deceleration, the vehicle behavior prediction device predicts that the vehicle will exhibit specific vehicle behavior. Similarly, when traveling speed and acceleration of a prediction-subject vehicle are included in each of the probability distributions concerning traveling speed and acceleration at the time of non-deceleration, the vehicle behavior prediction device predicts that the vehicle will not exhibit specific vehicle behavior. When traveling speed of a prediction-subject vehicle is included in probability distribution concerning traveling speed at the time of deceleration but acceleration of the prediction-subject vehicle is not included in probability distribution concerning traveling speed at the time of deceleration, it is determined that vehicle behavior of the vehicle is indeterminable. When traveling speed of a prediction-subject vehicle is included in probability distribution concerning traveling speed at the time of non-deceleration but acceleration of the prediction-subject vehicle is not included in probability distribution concerning traveling speed at the time of non-deceleration, it is determined that vehicle behavior of the vehicle is indeterminable.

In each of the embodiments, vehicle behavior prediction device predicts vehicle behavior using probability distribution formed based on an element that represents variation in vehicle behavior. The invention is not limited to this, and as shown in FIGS. 18(a) and 18(b) for example, it is also possible to form opposed vehicle behavior patterns of a vehicle behavior pattern Ly at the time of deceleration and a vehicle behavior pattern Ln at the time of non-deceleration based on traveling speed or acceleration of a vehicle 100 that travels through a specific traffic element such as an intersection SC for example. For example, when traveling speed of a prediction-subject vehicle of vehicle behavior is transition L1 and when this transition L1 matches with the vehicle behavior pattern Ly at the time of deceleration but does not match with the vehicle behavior pattern Ln at the time of non-deceleration, it is also possible to predict that deceleration behavior will occur in this vehicle. For example, when traveling speed of a prediction-subject vehicle of vehicle behavior is transition L2 and when this transition L2 matches with the vehicle behavior pattern Ln at the time of non-deceleration but does not match with the vehicle behavior pattern Ly at the time of deceleration, it is also possible to predict that deceleration behavior will not occur in this vehicle. When traveling speed of a prediction-subject vehicle of vehicle behavior is transition L3 and when this transition L3 matches with both the vehicle behavior pattern Ly at the time of deceleration and the vehicle behavior pattern Ln at the time of non-deceleration, it is also possible to predict that behavior of the vehicle is indeterminable. According to this, the vehicle behavior prediction device predicts vehicle behavior through matching between the vehicle behavior pattern of a prediction-subject vehicle and the vehicle behavior pattern Ly at the time of deceleration and the vehicle behavior pattern Ln at the time of non-deceleration. If the pattern matches with one of the vehicle behavior pattern Ly at the time of deceleration and the vehicle behavior pattern Ln at the time of non-deceleration, the vehicle behavior prediction device does not predict occurrence or non-occurrence of vehicle behavior. According to this, the vehicle behavior prediction device predicts vehicle behavior using two opposed vehicle behavior patterns, and accuracy of prediction of vehicle behavior is improved. When there is a possibility that any of occurrence and non-occurrence can be generated, it is determined that the vehicle behavior is indeterminable, and it is possible to predict vehicle behavior in three stages, i.e., occurrence, non-occurrence and indetermination of specific vehicle behavior. In this case, the distribution calculating units 143 and 212 correspond to the calculating unit.

In each of the embodiments, as a prediction-subject vehicle, the vehicle behavior prediction device predicts vehicle behavior of a vehicle in front, which travels in front of the vehicle 100 in the traveling direction. The invention is not limited to this. It is also possible to acquire information representing a traveling state of the vehicle 100, and to predict vehicle behavior of the vehicle 100 based on the acquired information and probability distribution. According to this, when the vehicle behavior prediction device predicts deceleration behavior of the vehicle 100 based on this prediction result for example, deceleration assistance is executed based on this prediction result. A vehicle of which the behavior is to be predicted may be a vehicle that follows the vehicle 100 or a vehicle that travels in parallel to the vehicle 100.

In each of the embodiments, the vehicle 100 is provided with the driving assistance unit 161, and driving assistance is carried out by the driving assistance unit 161. The invention is not limited to this, the driving assistance unit 161 may be omitted, and driving assistance of a driving system based on a prediction result of vehicle behavior does not necessarily need to be carried out. According to this configuration, a driver is informed of a prediction result of vehicle behavior through audio assistance or image assistance for example.

DESCRIPTION OF THE REFERENCE NUMERALS

100 . . . vehicle, 110 . . . vehicle state detecting unit, 111 . . . vehicle speed sensor, 112 . . . acceleration sensor, 120 . . . traveling environment detecting unit, 121 . . . GPS, 130 . . . vehicle-in-front-information acquiring unit, 131 . . . millimeter-wave radar, 132 . . . vehicular communication device, 140 . . . in-vehicle control device, 140A . . . in-vehicle control device, 141 . . . system control unit, 142 . . . traveling environment identifying unit, 142a . . . road map data, 143 . . . distribution calculating unit, 143a . . . reliability zone defining unit, 144 . . . database forming unit, 145 . . . vehicle behavior prediction unit, 145a . . . similar location extracting unit, 150 . . . distribution database, 160 . . . driving assistance unit, 161 . . . driving assistance unit, 162 . . . sound device, 163 . . . display device, 170 . . . vehicular communication device, 200 . . . management center, 201 . . . center communication device, 210 . . . computing processing device, 211 . . . traveling environment identifying unit, 211a . . . road map data, 212 . . . distribution calculating unit, 212a . . . reliability zone defining unit, 213 . . . database forming unit, 214 . . . vehicle behavior prediction unit, 214a . . . similar location extracting unit, 220 . . . distribution database, 300 . . . information terminal, 301 . . . terminal communication device, 302 . . . driving assistance unit, 303 . . . sound device, 304 . . . display device.

The invention claimed is:

1. A vehicle behavior prediction device for predicting vehicle behavior based on traveling state information representing a traveling state of a vehicle, wherein
the traveling state information includes at least one value of traveling speed of the vehicle and acceleration of the vehicle,
the vehicle behavior prediction device includes a vehicle behavior prediction unit configured to:
collect the traveling state information,
input a plurality of kinds of probability distributions representing occurrence probability of vehicle behavior with respect to the at least one value obtained based on the collected traveling state information, and
predict vehicle behavior of a prediction-subject vehicle based on whether the at least one value concerning the prediction-subject vehicle belongs to one of the plurality of kinds of probability distributions,
it is determined whether the at least one value belongs to the probability distribution depending upon whether the at least one value is included in one continuous region in which occurrence probability in the probability distribution is greater than zero,
the traveling state information further includes a traveling location in which the at least one value was detected,
the traveling location includes one of traffic elements including an intersection, a curve, and a temporary stop position,
the vehicle behavior prediction unit is further configured to:
input the plurality of kinds of probability distributions as probability distributions obtained for each traveling location, and
predict the vehicle behavior of the prediction-subject vehicle in a case where a traveling location of the prediction-subject vehicle has characteristics that are common with one of traveling locations in which the plurality of probability distributions were detected,
the plurality of kinds of probability distributions includes a probability distribution at occurrence of specific vehicle behavior and a probability distribution at non-occurrence of the specific vehicle behavior,
the vehicle behavior is deceleration behavior of the vehicle, and
the vehicle behavior prediction unit is further configured to:
collect information representing traveling speed and acceleration of the vehicle as the traveling state information,
input a plurality of kinds of probability distributions obtained for each of traveling speed and acceleration of the vehicle,
predict non-occurrence of the vehicle behavior using the probability distribution based on the traveling speed, and
predict occurrence of the vehicle behavior using the probability distribution based on the acceleration.

2. The vehicle behavior prediction device according to claim 1, wherein when the at least one value belongs to the probability distribution at non-occurrence of the specific vehicle behavior and does not belong to the probability distribution at occurrence of the specific vehicle behavior, the vehicle behavior prediction unit predicts that the prediction-subject vehicle will not exhibit corresponding vehicle behavior.

3. The vehicle behavior prediction device according to claim 1, wherein when the at least one value does not belong to the probability distribution at non-occurrence of the specific vehicle behavior or belongs to both the probability distribution at non-occurrence of the specific vehicle behavior and the probability distribution at occurrence of the specific vehicle behavior, the vehicle behavior prediction unit determines that it is indeterminable whether the prediction-subject vehicle will exhibit vehicle behavior.

4. The vehicle behavior prediction device according to claim 1, wherein when the at least one value belongs to the probability distribution at occurrence of the specific vehicle behavior and does not belong to the probability distribution at non-occurrence of the specific vehicle behavior, the vehicle behavior prediction unit predicts that the prediction-subject vehicle will exhibit corresponding vehicle behavior.

5. The vehicle behavior prediction device according to claim 1, wherein when the at least one value does not belong to the probability distribution at occurrence of the specific vehicle behavior or belongs to both the probability distribution at occurrence of the specific vehicle behavior and the probability distribution at non-occurrence of the specific vehicle behavior, the vehicle behavior prediction unit determines that it is indeterminable whether the prediction-subject vehicle will exhibit corresponding vehicle behavior.

6. A vehicle behavior prediction device for predicting vehicle behavior based on traveling state information representing a traveling state of a vehicle, wherein
the traveling state information includes at least one value of traveling speed of the vehicle and acceleration of the vehicle,
the vehicle behavior prediction device includes a vehicle behavior prediction unit configured to:
collect the traveling state information,
input a plurality of kinds of probability distributions representing occurrence probability of vehicle behavior with respect to the at least one value obtained based on the collected traveling state information, and
predict vehicle behavior of a prediction-subject vehicle based on whether the at least one value concerning the prediction-subject vehicle belongs to one of the plurality of kinds of probability distributions,
it is determined whether the at least one value belongs to the probability distribution depending upon whether the at least one value is included in one continuous region in which occurrence probability in the probability distribution is greater than zero,
the traveling state information further includes a traveling location in which the at least one value was detected,
the traveling location includes one of traffic elements including an intersection, a curve, and a temporary stop position,
the vehicle behavior prediction unit is further configured to:
input the plurality of kinds of probability distributions as probability distributions obtained for each traveling location, and
predict the vehicle behavior of the prediction-subject vehicle in a case where a traveling location of the prediction-subject vehicle has characteristics that are common with one of traveling locations in which the plurality of probability distributions were detected, the vehicle behavior prediction device further comprises a distribution calculating unit configured to obtain a plurality of kinds of probability distributions representing occurrence probability of vehicle behavior with respect to the at least one value that is input to the vehicle behavior prediction unit, the distribution calculating unit further includes a reliability zone defining unit configured to define a predetermined zone from a center of the probability distribution representing an average value of the vehicle behavior as a reliability zone concerning occurrence probability of the vehicle behavior, and the vehicle behavior prediction unit is further configured to predict vehicle behavior of the prediction-subject vehicle using the probability distribution in the reliability zone.

7. A vehicle behavior prediction device for predicting vehicle behavior based on traveling state information representing a traveling state of a vehicle, wherein the traveling state information includes at least one value of traveling speed of the vehicle and acceleration of the vehicle, the vehicle behavior prediction device includes a vehicle behavior prediction unit configured to:
collect the traveling state information,
input a plurality of kinds of probability distributions representing occurrence probability of vehicle behavior with respect to the at least one value obtained based on the collected traveling state information, and
predict vehicle behavior of a prediction-subject vehicle based on whether the at least one value concerning the prediction-subject vehicle belongs to one of the plurality of kinds of probability distributions, it is determined whether the at least one value belongs to the probability distribution depending upon whether the at least one value is included in one continuous region in which occurrence probability in the probability distribution is greater than zero, the traveling state information further includes a traveling location in which the at least one value was detected, the traveling location includes one of traffic elements including an intersection, a curve, and a temporary stop position, the vehicle behavior prediction unit is further configured to:
input the plurality of kinds of probability distributions as probability distributions obtained for each traveling location, and
predict the vehicle behavior of the prediction-subject vehicle in a case where a traveling location of the prediction-subject vehicle has characteristics that are common with one of traveling locations in which the plurality of probability distributions were detected, the plurality of kinds of probability distributions includes a probability distribution at occurrence of specific vehicle behavior and a probability distribution at non-occurrence of the specific vehicle behavior, the vehicle behavior prediction device further comprises a distribution calculating unit configured to obtain a plurality of kinds of probability distributions representing occurrence probability of vehicle behavior with respect to the at least one value that is input to the vehicle behavior prediction unit, the distribution calculating unit further includes a reliability zone defining unit configured to define a predetermined zone from a center of the probability distribution representing an average value of the vehicle behavior as a reliability zone concerning occurrence probability of the vehicle behavior, and the vehicle behavior prediction unit is further configured to determine whether vehicle behavior of the prediction-subject vehicle belongs to the probability distribution based on whether the vehicle behavior belongs to the reliability zone of the probability distributions.

8. A vehicle behavior prediction device for predicting vehicle behavior based on traveling state information representing a traveling state of a vehicle, wherein the traveling state information includes at least one value of traveling speed of the vehicle and acceleration of the vehicle, the vehicle behavior prediction device includes a vehicle behavior prediction unit configured to:
collect the traveling state information,
input a plurality of kinds of probability distributions representing occurrence probability of vehicle behavior with respect to the at least one value obtained based on the collected traveling state information, and
predict vehicle behavior of a prediction-subject vehicle based on whether the at least one value concerning the prediction-subject vehicle belongs to one of the plurality of kinds of probability distributions, it is determined whether the at least one value belongs to the probability distribution depending upon whether the at least one value is included in one continuous region in which occurrence probability in the probability distribution is greater than zero, the traveling state information further includes a traveling location in which the at least one value was detected, the traveling location includes one of traffic elements including an intersection, a curve, and a temporary stop position, the vehicle behavior prediction unit is further configured to:
input the plurality of kinds of probability distributions as probability distributions obtained for each traveling location, and
predict the vehicle behavior of the prediction-subject vehicle in a case where a traveling location of the prediction-subject vehicle has characteristics that are common with one of traveling locations in which the plurality of probability distributions were detected, the vehicle behavior prediction device further comprises a distribution calculating unit configured to obtain a plurality of kinds of probability distributions representing occurrence probability of vehicle behavior with respect to the at least one value that is input to the vehicle behavior prediction unit, information concerning a characteristic of the traveling location is included in the traveling state information, the distribution calculating unit is further configured to obtain the plurality of kinds of probability distributions for each of the characteristic of the traveling location, and when the vehicle behavior prediction unit predicts the vehicle behavior, the vehicle behavior prediction unit identifies the traveling location of the prediction-subject vehicle and a characteristic of the traveling location, and uses, for predicting the vehicle behavior, a plurality of kinds of probability distributions obtained by the distribution calculating unit concerning a traveling location and a characteristic of the traveling location that is common with the result of the identification.

9. A vehicle behavior prediction device for predicting vehicle behavior based on traveling state information representing a traveling state of a vehicle, wherein
the traveling state information includes at least one value of traveling speed of the vehicle and acceleration of the vehicle,
the vehicle behavior prediction device includes a vehicle behavior prediction unit configured to:
collect the traveling state information,
input a plurality of kinds of probability distributions representing occurrence probability of vehicle behavior with respect to the at least one value obtained based on the collected traveling state information, and
predict vehicle behavior of a prediction-subject vehicle based on whether the at least one value concerning the prediction-subject vehicle belongs to one of the plurality of kinds of probability distributions,
it is determined whether the at least one value belongs to the probability distribution depending upon whether the at least one value is included in one continuous region in which occurrence probability in the probability distribution is greater than zero,
the traveling state information further includes a traveling location in which the at least one value was detected,
the traveling location includes one of traffic elements including an intersection, a curve, and a temporary stop position,
the vehicle behavior prediction unit is further configured to:
input the plurality of kinds of probability distributions as probability distributions obtained for each traveling location, and
predict the vehicle behavior of the prediction-subject vehicle in a case where a traveling location of the prediction-subject vehicle has characteristics that are common with one of traveling locations in which the plurality of probability distributions were detected,
the vehicle behavior prediction device further comprises a distribution calculating configured to obtain a plurality of kinds of probability distributions representing occurrence probability of vehicle behavior with respect to the at least one value that is input to the vehicle behavior prediction unit,
the traveling state information is acquired based on information sent from a plurality of vehicles each having a wireless communication function to a management center of a probe information communication system,
at least one of the distribution calculating unit and the vehicle behavior prediction unit is provided in the management center, and
information representing at least one of the probability distribution and a prediction result of vehicle behavior of the prediction-subject vehicle is provided from the management center as requested.

10. A driving assistance device for assisting a driving operation of a driver based on a prediction result of vehicle behavior, the driving assistance device including a driving assistance unit that predicts vehicle behavior of a vehicle to be assisted in the driving operation or a vehicle in front traveling in front of the vehicle in the traveling direction using a vehicle behavior prediction device according to claim 1, and executes driving assistance based on the predicted vehicle behavior.

11. A vehicle behavior prediction method for predicting vehicle behavior based on traveling state information representing a traveling state of a vehicle using a vehicle behavior prediction device, wherein
the traveling state information includes at least one of traveling speed of the vehicle and acceleration of the vehicle,
the vehicle behavior prediction method comprises:
collecting the traveling state information;
predicting vehicle behavior of a prediction-subject vehicle based on whether the at least one value concerning the prediction-subject vehicle belongs to one of a plurality of kinds of probability distributions using the plurality of kinds of probability distributions representing occurrence probability of vehicle behavior with respect to the at least one value obtained based on the collected traveling state information, and
determining whether the at least one value belongs to the probability distribution depending upon whether the at least one value is included in one continuous region in which occurrence probability in the probability distribution is greater than zero,
the traveling state information further includes a traveling location in which the at least one value was detected,
the traveling location includes one of traffic elements including an intersection, a curve, and a temporary stop position,
the vehicle behavior prediction method further comprises using the plurality of kinds of probability distributions as probability distributions obtained for each traveling location,
the predicting of the vehicle behavior of the prediction-subject vehicle is performed in a case where a traveling location of the prediction-subject vehicle has characteristics that are common with one of traveling locations in which the plurality of probability distributions were detected,
a probability distribution at occurrence of specific vehicle behavior and a probability distribution at non-occurrence of the specific vehicle behavior are used as the plurality of kinds of probability distributions,
deceleration behavior of a vehicle is selected as the vehicle behavior, and
in the predicting of the vehicle behavior, non-occurrence of the vehicle behavior is predicted using a probability distribution based on traveling speed, and occurrence of the vehicle behavior is predicted using a probability distribution based on acceleration.

12. The vehicle behavior prediction method according to claim 11, wherein in the predicting of the vehicle behavior, when the at least one value belongs to the probability distribution at non-occurrence of the specific vehicle behavior and does not belong to the probability distribution at occurrence of the specific vehicle behavior, it is predicted that the prediction-subject vehicle will not exhibit corresponding vehicle behavior.

13. The vehicle behavior prediction method according to claim 11, wherein in the predicting of the vehicle behavior, when the at least one value does not belong to the probability distribution at non-occurrence of the specific vehicle behavior or belongs to both the probability distribution at non-occurrence of the specific vehicle behavior and the probability distribution at occurrence of the specific vehicle behavior, it is determined that it is indeterminable whether vehicle behavior of the prediction-subject vehicle will not be exhibited.

14. The vehicle behavior prediction method according to claim 11, wherein in the predicting of the vehicle behavior, when the at least one value belongs to the probability distribution at occurrence of the specific vehicle behavior and does not belong to the probability distribution at non-occurrence of the specific vehicle behavior, it is predicted that the prediction-subject vehicle will exhibit corresponding vehicle behavior.

15. The vehicle behavior prediction method according to claim 11, wherein in the predicting of the vehicle behavior, when the at least one value does not belong to the probability distribution at occurrence of the specific vehicle behavior or belongs to both the probability distribution at occurrence of the specific vehicle behavior and the probability distribution at non-occurrence of the specific vehicle behavior, it is determined that it is indeterminable whether the prediction-subject vehicle will exhibit corresponding vehicle behavior.

16. A vehicle behavior prediction method for predicting vehicle behavior based on traveling state information representing a traveling state of a vehicle using a vehicle behavior prediction device, wherein
the traveling state information includes at least one of traveling speed of the vehicle and acceleration of the vehicle,
the vehicle behavior prediction method comprises:
collecting the traveling state information;
predicting vehicle behavior of a prediction-subject vehicle based on whether the at least one value concerning the prediction-subject vehicle belongs to one of a plurality of kinds of probability distributions using the plurality of kinds of probability distributions representing occurrence probability of vehicle behavior with respect to the at least one value obtained based on the collected traveling state information, and
determining whether the at least one value belongs to the probability distribution depending upon whether the at least one value is included in one continuous region in which occurrence probability in the probability distribution is greater than zero,
the traveling state information further includes a traveling location in which the at least one value was detected,
the traveling location includes one of traffic elements including an intersection, a curve, and a temporary stop position,
the vehicle behavior prediction method further comprises using the plurality of kinds of probability distributions as probability distributions obtained for each traveling location,
the predicting of the vehicle behavior of the prediction-subject vehicle is performed in a case where a traveling location of the prediction-subject vehicle has characteristics that are common with one of traveling locations in which the plurality of probability distributions were detected,
the vehicle behavior prediction method further comprises defining a predetermined zone from a center of the probability distribution representing an average value of the vehicle behavior as a reliability zone concerning occurrence probability of the vehicle behavior, and
in the predicting of the vehicle behavior, the vehicle behavior is predicted using the probability distribution in the reliability zone as the probability distribution.

17. A vehicle behavior prediction method for predicting vehicle behavior based on traveling state information representing a traveling state of a vehicle using a vehicle behavior prediction device, wherein
the traveling state information includes at least one of traveling speed of the vehicle and acceleration of the vehicle,
the vehicle behavior prediction method comprises:
collecting the traveling state information;
predicting vehicle behavior of a prediction-subject vehicle based on whether the at least one value concerning the prediction-subject vehicle belongs to one of a plurality of kinds of probability distributions using the plurality of kinds of probability distributions representing occurrence probability of vehicle behavior with respect to the at least one value obtained based on the collected traveling state information, and
determining whether the at least one value belongs to the probability distribution depending upon whether the at least one value is included in one continuous region in which occurrence probability in the probability distribution is greater than zero,
the traveling state information further includes a traveling location in which the at least one value was detected,
the traveling location includes one of traffic elements including an intersection, a curve, and a temporary stop position,
the vehicle behavior prediction method further comprises using the plurality of kinds of probability distributions as probability distributions obtained for each traveling location,
the predicting of the vehicle behavior of the prediction-subject vehicle is performed in a case where a traveling location of the prediction-subject vehicle has characteristics that are common with one of traveling locations in which the plurality of probability distributions were detected,
a probability distribution at occurrence of specific vehicle behavior and a probability distribution at non-occurrence of the specific vehicle behavior are used as the plurality of kinds of probability distributions,
the vehicle behavior prediction method further comprises defining a predetermined zone from a center of the probability distribution representing an average value of the vehicle behavior as a reliability zone concerning occurrence probability of the vehicle behavior, and
in the predicting of the vehicle behavior, it is determined whether vehicle behavior of a prediction-subject vehicle belongs to the probability distribution based on whether the vehicle behavior belongs to the reliability zone of the probability distributions.

18. A vehicle behavior prediction method for predicting vehicle behavior based on traveling state information representing a traveling state of a vehicle using a vehicle behavior prediction device, wherein
the traveling state information includes at least one of traveling speed of the vehicle and acceleration of the vehicle,
the vehicle behavior prediction method comprises:
collecting the traveling state information;
predicting vehicle behavior of a prediction-subject vehicle based on whether the at least one value concerning the prediction-subject vehicle belongs to one of a plurality of kinds of probability distributions using the plurality of kinds of probability distributions representing occurrence probability of vehicle behavior with respect to the at least one value obtained based on the collected traveling state information, and determining whether the at least one value belongs to the probability distribution depending upon whether the at least one value is included in one continuous region in which occurrence probability in the probability distribution is greater than zero, the traveling state information further includes a traveling location in which the at least one value was detected, the traveling location includes one of traffic elements including an intersection, a curve, and a temporary stop position, the vehicle behavior prediction method further comprises using the plurality of kinds of probability distributions as probability distributions obtained for each traveling location, the predicting of the vehicle behavior of the prediction-subject vehicle is performed in a case where a traveling location of the prediction-subject vehicle has characteristics that are common with one of traveling locations in which the plurality of probability distributions were detected, the vehicle behavior prediction method further comprising obtaining a plurality of kinds of probability distributions representing occurrence probability of the vehicle behavior used in the predicting, identifying an information representing a characteristic of the traveling location is selected as the traveling state information, in the obtaining of the distribution, the plurality of kinds of probability distributions are obtained for the characteristic of the traveling location, in the predicting of the vehicle behavior, the method further comprises identifying the traveling location of a prediction-subject vehicle and a characteristic of the traveling location, and selecting, from the probability distributions, a plurality of kinds of probability distributions concerning a traveling location and a characteristic of the traveling location that is common with an identifying result of the identifying, and the probability distributions selected is used for predicting the vehicle behavior.

* * * * *